United States Patent
Mack, Sr. et al.

(10) Patent No.: US 7,235,514 B2
(45) Date of Patent: Jun. 26, 2007

(54) TRIBOLOGICAL MATERIALS AND STRUCTURES AND METHODS FOR MAKING THE SAME

(75) Inventors: Edward J. Mack, Sr., Bristol, RI (US); James P. Mack, Bristol, RI (US); Thomas P. Mack, Warren, RI (US)

(73) Assignee: Tri-Mack Plastics Manufacturing Corp., Bristol, RI (US)

(*) Notice: Subject to any disclaimer, the term of this patent is extended or adjusted under 35 U.S.C. 154(b) by 277 days.

(21) Appl. No.: 09/833,755

(22) Filed: Apr. 11, 2001

(65) Prior Publication Data

US 2005/0096234 A1   May 5, 2005

Related U.S. Application Data

(60) Provisional application No. 60/222,108, filed on Jul. 28, 2000, provisional application No. 60/222,107, filed on Jul. 28, 2000.

(51) Int. Cl.
*F16C 13/00* (2006.01)

(52) U.S. Cl. ............... 508/100; 508/106; 508/107; 508/108; 508/109

(58) Field of Classification Search ......... 508/100–109
See application file for complete search history.

(56) References Cited

U.S. PATENT DOCUMENTS

| | | | |
|---|---|---|---|
| 3,406,126 A | 10/1968 | Litant | |
| 3,652,409 A | 3/1972 | Mack et al. | |
| 4,115,283 A * | 9/1978 | Needham | 508/107 |
| 4,293,670 A | 10/1981 | Robeson et al. | |
| 4,491,536 A | 1/1985 | Tomoda | |
| 4,532,054 A | 7/1985 | Johnson | 252/12.4 |
| 4,540,624 A | 9/1985 | Cannady, Jr. | |
| 4,592,782 A * | 6/1986 | Davies | 75/253 |
| 4,599,383 A | 7/1986 | Satoji | 525/180 |
| 4,717,505 A | 1/1988 | Delphin | |
| 4,810,419 A | 3/1989 | Kunimoto | |
| 4,847,135 A * | 7/1989 | Braus et al. | 428/138 |
| 4,965,310 A | 10/1990 | Harris et al. | |
| 5,001,184 A * | 3/1991 | Barnes et al. | 524/495 |
| 5,098,610 A | 3/1992 | Okamura | |
| 5,334,330 A | 8/1994 | Rowlette | |
| 5,373,046 A | 12/1994 | Okamura | |
| 5,384,352 A | 1/1995 | Andres et al. | 524/404 |
| 5,506,293 A | 4/1996 | Steelman | |
| 5,580,918 A | 12/1996 | Morita et al. | 524/413 |

(Continued)

OTHER PUBLICATIONS

Copy of PCT International SearchReport for International application No. PCT/US01/23679, Filing date Jul. 27, 2001, Claiming Priority of Jul. 28, 2000, Applicant: TRI-MACK Plastics Manufacturing Corp., (2) pages.

(Continued)

*Primary Examiner*—Ellen M. McAvoy
(74) *Attorney, Agent, or Firm*—Edwards Angell Palmer & Dodge LLP; David G. Conlin; Mark D. Russett

(57) ABSTRACT

An article having a bearing surface with improved wear characteristics is provided. The article may be formed from a composition that includes a polymeric material, a lubricious and reinforcing additive, and a solid lubricant. Methods for forming the compositions and structures are also provided.

64 Claims, 19 Drawing Sheets

U.S. PATENT DOCUMENTS

| | | | |
|---|---|---|---|
| 5,725,707 A | | 3/1998 | Koon et al. |
| 5,750,620 A | * | 5/1998 | Davies et al. .................. 525/67 |
| 5,821,204 A | * | 10/1998 | Kato et al. .................. 508/106 |
| 5,834,337 A | | 11/1998 | Unger |
| 5,866,647 A | * | 2/1999 | Massey et al. .............. 508/100 |
| 5,876,632 A | | 3/1999 | Miyakawa et al. |
| 5,906,967 A | * | 5/1999 | Kato et al. .................. 508/106 |
| 5,955,543 A | | 9/1999 | Sachdev et al. |
| 5,962,122 A | | 10/1999 | Walpita et al. |
| 5,965,268 A | | 10/1999 | Sastri et al. |
| 5,971,617 A | | 10/1999 | Woelki et al. |
| 5,985,458 A | | 11/1999 | Angelopoulos et al. |
| 5,998,339 A | * | 12/1999 | Kato et al. .................. 508/106 |
| 6,015,509 A | | 1/2000 | Angelopoulos et al. |
| 6,015,521 A | | 1/2000 | Nishiwaki |
| 6,037,397 A | | 3/2000 | Satoh et al. |
| 6,048,919 A | | 4/2000 | McCullough |
| 6,054,520 A | | 4/2000 | Washio et al. |
| 6,060,539 A | | 5/2000 | Hermansen et al. |
| 6,074,576 A | | 6/2000 | Zhao et al. |
| 6,075,114 A | | 6/2000 | Umetsu et al. |
| 6,086,791 A | | 7/2000 | Miller |
| 6,086,792 A | | 7/2000 | Reid et al. |
| 6,090,313 A | | 7/2000 | Zhao |
| 6,096,818 A | | 8/2000 | Nakaura et al. |
| 6,103,803 A | | 8/2000 | Cheung et al. |
| 6,132,645 A | | 10/2000 | Hedges |
| 6,139,783 A | | 10/2000 | McCullough |
| 6,162,849 A | * | 12/2000 | Zhuo et al. .................. 524/404 |
| 6,730,731 B2 | * | 5/2004 | Tobita et al. ............... 524/495 |
| 6,794,035 B2 | * | 9/2004 | Tobita et al. ............... 428/402 |
| 2002/0111415 A1 | | 8/2002 | Mack, Sr. et al. |

OTHER PUBLICATIONS

Lewis, "Predicting Bearing Performance of Filled Teflon TFE Resins," Document No. ASME 66-WA/RP-1, pp. 1-5, Journal of Engineering for Industry, Transactions of the ASME.

Wolverton, "Advanced Thermoplastic Composites for High Temperature Gear and Bearing Applications," pp. 1-21.

Lewis, "Predicting the Wear of Sliding Plastic Surfaces," Mechanical Engineering, 68:32-35 (1964).

Yoo, et al., "Tribological Behavior of Blends of Polyether Ether Ketone and Polyether Imide," Wear, 162-164, pp. 418-425 (1993).

Dufour, et al.., "The Effect of Glassfibre, Graphite and $MoS_2$ on the Tribological Performance of a Liquid Crystalline Polymer," Wear, 156:85-100 (1992).

Briscoe, et al., "The Failure of Poly (ether ether ketone) in High Speed Contacts," Wear, 162-164, pp.407-417 (1993).

Hanchi, et al., "The Tribological Behavior of Blends of Polyetheretherketone (PEEK) and Polyetherimide (PEI) at Elevated Temperatures," Tribology Transactions, 37:494-504 (1994).

Hanmin et al., "Friction and Wear of Poly(Phenylene Sulphide) and its Carbon Fibre Composites: I Unlubricated," Wear, 116:59-68 (1987).

Bijwe, et al "Friction and Wear Studies of Polyetherimide Composites," Wear, 138:61-76 (1990).

* cited by examiner

FIG. 2

| FIG. 2A | FIG. 2B |
|---|---|

PV. LIMITS BASED ON INCREASING SPEED AND INCREASING PRESSURE

| TEST # | POLYMERIC MATRIX | COMMERCIALLY AVAILABLE COMPETETIVE MATERIALS (PREBLENDED) | COMPOSITIONS ||| FIRST ADDITIVE |
|---|---|---|---|---|---|
| | | | POLYMERIC MATRIX MATERIALS USED FOR EXEMPLARY COMPOSITIONS | % | |
| 1 | PEI | | ULTEM 1010 | 55 | DKD FIBER |
| 2 | PEI | | ULTEM 1010 | 55 | DKD FIBER |
| 3 | PEI | | ULTEM 1010 | 55 | DKD FIBER |
| 4 | PEI | | ULTEM 1010 | 55 | DKD FIBER |
| 5 | PEI | | ULTEM 1010 | 55 | DKD FIBER |
| 6 | PEI | | ULTEM 1010 | 50 | DKD FIBER |
| 7 | PEI | | ULTEM 1010 | 70 | TFE FIBER |
| 8 | PEI | | ULTEM 1010 | 70 | DKA FIBER |
| 9 | PEI | | ULTEM 1010 | 60 | DKA FIBER |
| 10 | PEI | | ULTEM 1010 | 50 | DKA FIBER |
| 11 | PEI | | ULTEM 1010 | 40 | DKA FIBER |
| 12 | PEI | | ULTEM 1010 | 30 | DKD FIBER |
| 13 | PEI | | ULTEM 1010 | 100 | |
| 14 | PEI | ULTEM 7201 | | 80 | CARBON FIBER |
| 15 | PEI | ULTEM 7301 | | 75 | CARBON FIBER |
| 16 | PEI | EL 4040 | | 80 | |
| 17 | PEEK | | VICTREX 150 | 55 | DKD FIBER |
| 18 | PEEK | | VICTREX 150 | 55 | DKD FIBER |
| 19 | PEEK | | VICTREX 150 | 55 | DKD FIBER |
| 20 | PEEK | VICTREX FC 30 | | 70 | CARBON FIBER |
| 21 | PEEK | VICTREX FC 30 | | 70 | CARBON FIBER |
| 22 | PEEK | VICTREX CA 30 | | 70 | CARBON FIBER |
| 23 | PEEK | VICTREX CA 30 | | 70 | CARBON FIBER |
| 24 | PI | | AUREM | 55 | DKD FIBER |
| 25 | PI/PEI | | AUREM/ULTEM 1010 | 44/11 | DKD FIBER |
| 26 | PI/PEI | | AUREM/ULTEM 1010 | 37.5/12.5 | DKD FIBER |
| 27 | PI | AUREM JNF 3020 | | 80 | |
| 28 | PI | AUREM JNF 3025 | | | |
| 29 | PI | AUREM JCN 6530 | | 70 | CARBON FIBER |
| 30 | PI | AUREM JCF 6525 | | | CARBON FIBER |
| 31 | LCP/PEI | | LCP/ULTEM 1010 | 37.5/12.5 | DKD FIBER |
| 32 | LCP | VECTRA B230 | | 70 | CARBON FIBER |
| 33 | PPS | | TICONA 020584 | 55 | DKD FIBER |
| 34 | PPS | | TICONA 020584 | 50 | DKD FIBER |
| 35 | PPS | OL 4060 | | 70 | |
| 36 | PAI | TORLON 7130 | | 70 | CARBON FIBER |
| 37 | PAI | TORLON 4301 | | 85 | |

FIG. 2A

PV. LIMITS BASED ON INCREASING SPEED AND INCREASING PRESSURE

| COMPOSTIONS | | | | PV LIMIT BASED ON INCREASING VELOCITY @100 PSI | PV LIMIT BASED ON INCREASING PRESSURE @25 FPM |
|---|---|---|---|---|---|
| % | SECOND ADDITIVE(S) | % | METHOD OF BLENDING | | |
| 30 | TFE FIBER | 15 | SOLVENT | 90,000 | 50000+ |
| 30 | TFE FIBER | 15 | SOLVENT | 97,000+ | 65000+ |
| 30 | TFE FIBER | 15 | SOLVENT | 90,000+ | |
| 30 | TFE FIBER | 15 | DRY | 60,000 | |
| 30 | TFE POWDER | 15 | SOLVENT | 60,000 | |
| 25 | BN PLATELETS | 25 | SOLVENT | 90,000+ | |
| 30 | | | SOLVENT | 40,000 | |
| 30 | | | SOLVENT | 30,000 | |
| 40 | | | SOLVENT | 50,000 | |
| 50 | | | SOLVENT | 60,000 | |
| 60 | | | SOLVENT | 70,000 | |
| 60 | BN PLATELETS | 10 | SOLVENT | 90,000+ | |
| | | | PREBLEND | <10,000 | |
| 20 | | | PREBLEND | 40,000 | |
| 25 | | | PREBLEND | 20,000 | |
| | TFE POWDER | 20 | PREBLEND | 20,000 | |
| 30 | BN PLATELETS | 15 | DRY | 60,000 | |
| 30 | BN PLATELETS | 15 | DRY | 50,000 | |
| 25 | BN PLATELETS | 25 | DRY | 80,000 | |
| 10 | GRAPHITE POWDER/TFE POWER | 10/10 | PREBLEND | 30,000 | 30,000 |
| 10 | GRAPHITE POWDER/TFE POWER | 10/10 | PREBLEND | 40,000 | 30,000 |
| 30 | | | PREBLEND | 30,000 | 30,000 |
| 30 | | | PREBLEND | 50,000 | 40,000 |
| 30 | TFE FIBER | 15 | DRY | 70,000 | |
| 30 | TFE FIBER | 15 | CONCENTRATE | 90,000 | |
| 25 | BN PLATELETS | 25 | CONCENTRATE | 90,000 | |
| | TFE POWDER | 20 | PREBLEND | 50,000 | 50,000 |
| | TFE POWDER | | PREBLEND | 40,000 | 30,000 |
| 30 | | | PREBLEND | 40,000 | 45,000 |
| | | | PREBLEND | 40,000 | 30,000 |
| 25 | BN PLATELETS | 25 | CONCENTRATE | 90,000 | |
| 30 | | | PREBLEND | 10,000 | 15,000 |
| 30 | TFE FIBER | 15 | DRY | 50,000 | 56,000 |
| 25 | BN PLATELETS | 25 | DRY | 50,000 | |
| | TFE POWDER | 30 | PREBLEND | 30,000 | 30,000 |
| 30 | | | PREBLEND | 30,000 | 35,000 |
| | GRAPHITE POWDER/TFE POWER | 12/3 | PREBLEND | 30,000 | 20,000 |

FIG. 2B

BEARING WEAR PROPERTIES OF THE PRESENT COMPOSITIONS
IN COMPARISION TO COMMERCIALLY AVAILABLE COMPOSITIONS

| TEST # | POLYMERIC MATRIX | COMMERCIALLY AVAILABLE COMPETETIVE MATERIALS (PREBLENDED) | COMPOSTIONS ||| 
|---|---|---|---|---|---|
| | | | POLYMERIC MATRIX MATERIALS USED FOR EXEMPLARY COMPOSITIONS | % | FIRST ADDITIVE |
| 38 | PEI | | ULTEM 1010 | 55 | DKD FIBER |
| 39 | PEI | | ULTEM 1010 | 55 | DKD FIBER |
| 40 | PEI | | ULTEM 1010 | 55 | DKD FIBER |
| 41 | PEI | | ULTEM 1010 | 50 | DKD FIBER |
| 42 | PEI | | ULTEM 1040 | 30 | DKD FIBER |
| 43 | PEI | ULTEM 7201 | | 80 | CARBON FIBER |
| 44 | | EL 4040 | | 80 | |
| 45 | PEEK | | VICTREX 150 | 55 | DKD FIBER |
| 46 | PEEK | | VICTREX 150 | 55 | DKD FIBER |
| 47 | PEEK | | VICTREX 150 | 50 | DKD FIBER |
| 48 | PEEK | | VICTREX 150 | 50 | DKD FIBER |
| 49 | PEEK | | VICTREX 150 | 30 | DKD FIBER |
| 50 | PEEK | | VICTREX 150/ULTEM 1010 | 41/9 | DKD FIBER |
| 51 | PEEK | VICTREX FC30 | | 70 | CARBON FIBER |
| 52 | PEEK | VICTREX CA30 | | 70 | CARBON FIBER |
| 53 | PEEK | EL 4030 | | 85 | |
| 54 | PI/PEI | | AUREM/ULTEM 1010 | 44/11 | DKD FIBER |
| 55 | PI/PEI | | AUREM/ULTEM 1010 | 37.5/12.5 | DKD FIBER |
| 56 | | AUREM JCF 6525 | | | |
| 57 | PI | AUREM JCN 6530 | | 70 | CARBON FIBER |
| 58 | PI | AUREM JCF 3020 | | 80 | |
| 59 | LCP/PEI | | LCP/ULTEM 1010 | 37.5/12.5 | DKD FIBER |
| 60 | LCP | XYDAR 96043 | | 40 | CARBON FIBER |
| 61 | LCP | VICTRA E230 | | 70 | CARBON FIBER |
| 62 | PPS | | TICONA 020584 | 55 | DKD FIBER |
| 63 | PPS | | TICONA 020584 | 50 | DKD FIBER |
| 64 | PPS | DL 4040 | | 80 | |
| 65 | PPS | 1350AR15TFE15 | | 70 | ARAMID FIBER |

FOOTNOTE 1: THE PV LIMIT BASED ON INCREASING SPEED AT 200 PSI IS:

| PV LIMIT | SHAFT TEMPERATURE | COEFFICIENT OF FRICTION |
|---|---|---|
| 180,000 | 315 | 0.02 |
| 180,000 | 310 | 0.03 |

| FIG. 3A | FIG. 3B | FIG. 3C |
|---|---|---|

BEARING WEAR PROPERTIES OF THE PRESENT COMPOSITIONS IN COMPARISION TO COMMERCIALLY AVAILABLE COMPOSITIONS

| COMPOSTIONS | | | |
|---|---|---|---|
| % | SECOND ADDITIVE(S) | % | METHOD OF BLENDING |
| 30 | TFE FIBER | 15 | SOLVENT |
| 30 | TFE FIBER | 15 | EXTRUSION |
| 30 | TFE POWDER | 15 | SOLVENT |
| 25 | BN PLATELETS | 25 | SOLVENT |
| 60 | BN PLATELETS | 10 | SOLVENT |
| 20 | | | PREBLEND |
| | TFE POWDER | 20 | |
| 30 | TFE FIBER | 15 | DRY |
| 30 | BN PLATELETS | 15 | DRY |
| 25 | BN PLATELETS | 25 | DRY |
| 25 | BN PLATELETS | 25 | EXTRUSION |
| 70 | | | DRY |
| 25 | BN PLATELETS | 25 | CONCENTRATE |
| 10 | GRAPHITE POWDER TFE POWDER | 10/10 | PREBLEND |
| 30 | | | PREBLEND |
| | TFE POWDER | 15 | PREBLEND |
| 30 | TFE FIBER | 15 | CONCENTRATE |
| 25 | BN PLATELETS | 25 | CONCENTRATE |
| | | | PREBLEND |
| 30 | | | PREBLEND |
| | TFE FIBER | 20 | PREBLEND |
| 25 | BN PLATELETS | 25 | CONCENTRATE |
| 60 | | | PREBLEND |
| 30 | | | PREBLEND |
| 30 | TFE FIBER | 15 | DRY |
| 25 | BN PLATELETS | 25 | DRY |
| | TFE POWDER | 20 | PREBLEND |
| 15 | TFE POWDER | 15 | PREBLEND |

FIG. 3B

BEARING WEAR PROPERTIES OF THE PRESENT COMPOSITIONS
IN COMPARISION TO COMMERCIALLY AVAILABLE COMPOSITIONS

| WEAR (K) PRESSURE X VELOCITY | | | SHAFT TEMPERATURE (F) PRESSURE X VELOCITY | | | COEFFICIENT OF FRICTION PRESSURE X VELOCITY | | |
|---|---|---|---|---|---|---|---|---|
| 50x200 | 100x100 | 200x50 | 50x200 | 100x100 | 200x50 | 50x200 | 100x100 | 200x50 |
| 8 | 12 | 16 | 140 | 170 | 180 | 0.2 | 0.22 | 0.21 |
| 25 | 21 | 23 | 180 | 255 | 220 | 0.32 | 0.28 | 0.28 |
| 13 | 15 | 25 | 200 | 250 | 195 | 0.4 | 0.36 | 0.3 |
| 15 | 23 | 12 | 170 | 170 | 160 | 0.24 | 0.19 | 0.19 |
| 18 | 10 | 12 | 132 | 170 | 174 | 0.24 | 0.19 | |
| 173 | 70 | 79 | 365 | 265 | 335 | 0.52 | 0.24 | |
| 101 | 52 | 66 | 250 | 250 | 250 | 0.36 | 0.12 | 0.2 |
| 22 | 26 | 19 | 320 | 245 | 250 | 0.3 | 0.3 | 0.3 |
| 9 | 9 | 6 | 150 | 175 | 160 | 0.32 | 0.24 | 0.19 |
| 6 | 6 | 2 | 155 | 175 | 160 | 0.32 | 0.24 | 0.2 |
| 19 | 19 | 10 | 135 | 175 | 150 | 0.24 | 0.22 | 0.2 |
| 24 | | 36 | 142 | | 142 | 0.3 | | 0.24 |
| 19 | 19 | 10 | 135 | 180 | 165 | 0.24 | 0.22 | 0.22 |
| 177 | 160 | 251 | 306 | 290 | 260 | 0.33 | 0.4 | 0.2 |
| 500 | 77 | 120 | 350 | 310 | 375 | 0.62 | 0.56 | 0.7 |
| 172 | 22 | 30 | 204 | 238 | 208 | 0.34 | 0.21 | 0.2 |
| 20 | 35 | 20 | 210 | 205 | 220 | 0.28 | 0.28 | 0.32 |
| 4 | 10 | 9 | 190 | 212 | 190 | 0.3 | 0.2 | 0.18 |
| 269 | 240 | 185 | 374 | 115 | 337 | 0.45 | 0.44 | 0.38 |
| 115 | 109 | 161 | 375 | 390 | 340 | 0.57 | 0.62 | 0.48 |
| 113 | 108 | 143 | 250 | 334 | 150 | 0.38 | 0.29 | 0.19 |
| 3 | 21 | 1 | 185 | 176 | 170 | 0.24 | 0.2 | 0.16 |
| 241 | 223 | 210 | 187 | 180 | 100 | 0.4 | 0.38 | 0.4 |
| 160 | 125 | 50 | 351 | 290 | 269 | 0.40 | 0.44 | 0.4 |
| | | 16 | | | 251 | | | 0.39 |
| 26 | 18 | 10 | 210 | 226 | 234 | 0.29 | 0.27 | 0.28 |
| 256 | 48 | 110 | 298 | 201 | 251 | 0.43 | 0.16 | 0.25 |
| 124 | 192 | 509 | 250 | 302 | 272 | 0.25 | 0.17 | 0.27 |

FIG. 3C

WEAR PROPERTIES AT HIGH VALUES OF PRESSURE X VELOCITY

COMPOSITIONS

| TEST # | POLYMERIC MATRIX | COMMERCIALLY AVAILABLE COMPETETIVE MATERIALS (PREBLENDED) | POLYMERIC MATRIX MATERIALS USED FOR EXEMPLARY COMPOSITIONS | % | FIRST ADDITIVE | % | SECOND ADDITIVE(S) | % | METHOD OF BLENDING |
|---|---|---|---|---|---|---|---|---|---|
| 66 | PEI | | ULTEM 1010 | 55 | DKD FIBER | 30 | TFE FIBER | 15 | SOLVENT |
| 67 | PEI | | ULTEM 1010 | 55 | DKD FIBER | 30 | TFE FIBER | 15 | EXTRUSION |
| 68 | PEI | | ULTEM 1010 | 50 | DKD FIBER | 25 | BN PLATELETS | 25 | SOLVENT |
| 69 | PEI | | ULTEM 1010 | 30 | DKD FIBER | 60 | BN PLATELETS | 10 | SOLVENT |
| 70 | PEI | | ULTEM 1040 | 28 | DKD FIBER | 70 | DC4-7105 | 2 | SOLVENT |
| 71 | PEI | ULLEM 7201 | | 80 | CARBON FIBER | 20 | | | PREBLEND |
| 72 | PEEK | | VICTREX 150 | 55 | DKD FIBER | 30 | TFE FIBER | 15 | DRY |
| 73 | PEEK | | VICTREX 150 | 50 | DKD FIBER | 25 | BN PLATELETS | 25 | EXTRUSION |
| 74 | PEEK | | VICTREX 150 | 50 | DKD FIBER | 25 | BN PLATELETS | 25 | DRY |
| 75 | PEEK | | VICTREX 150 | 29 | DKD FIBER | 70 | CAPOW L38/H | 1 | DRY |
| 76 | PEEK | | VICTREX 150 | 48 | DKD FIBER | 25 | BN PLATELETS/DC4-7105 | 25/2 | DRY |
| 77 | PEEK | VICTREX FC 30 | | 70 | CARBON FIBER | 10 | GRAPHITE POWDER/TFE POWDER | 10/10 | PREBLEND |
| 78 | PEEK | VICTREX CA 30 | | 70 | CARBON FIBER | 30 | | | PREBLEND |
| 79 | PPS | | TICONA 020584 | 28 | DKD FIBER | 70 | DC4-7105 | 2 | DRY |
| 80 | PPS | | TICONA 020584 | 30 | DKD FIBER | 10 | GRAPHITE POWDER | 60 | DRY |
| 81 | PPS | OL 4040 | | 80 | | | TFE POWDER | 20 | PREBLEND |
| 82 | PI/PEI | | AUREM/ULTEM 1010 | 44/6 | DKD FIBER | 25 | TFE FIBER | 25 | CONCENTRATE |
| 83 | PI/PEI | | AUREM/ULTEM 1010 | 38/12 | DKD FIBER | 25 | BN PLATELETS | 25 | CONCENTRATE |
| 84 | PI | AUREM JCN 6530 | | 70 | CARBON FIBER | 30 | | | PREBLEND |
| 85 | PI | AUREM JNF 3020 | | 80 | | | TFE POWDER | 20 | PREBLEND |

FOOTNOTES:
1. AFTER 1 HOUR
2. AFTER 3 HOURS
3. AFTER 5 MINUTES
4. AFTER 15 MINUTES
5. AFTER 1 MINUTE

| FIG. 4A |
|---|
| FIG. 4B |

WEAR PROPERTIES AT HIGH VALUES OF PRESSURE X VELOCITY

| WEAR (K) | | | | | SHAFT TEMPERATURE (F) | | | | | COEFFICIENT OF FRICTION | | | | |
|---|---|---|---|---|---|---|---|---|---|---|---|---|---|---|
| PRESSURE X VELOCITY | | | | | PRESSURE X VELOCITY | | | | | PRESSURE X VELOCITY | | | | |
| 10,000 | 20,000 | 40,000 | 80,000 | 100,000 | 10,000 | 20,000 | 40,000 | 80,000 | 100,000 | 10,000 | 20,000 | 40,000 | 80,000 | 100,000 |
| 200x50 | 200x100 | 200x200 | 200x400 | 200x500 | 200x50 | 200x100 | 200x200 | 200x400 | 200x500 | 200x50 | 200x100 | 200x200 | 200x400 | 200x500 |
| 16 | 61 | 70 | MELTED(1) | | 180 | 210 | 330 | MELTED(1) | | 0.21 | 0.24 | 0.12 | MELTED(1) | |
| 23 | | 72 | MELTED(5) | | 220 | | 340 | MELTED(5) | | 0.28 | | 0.14 | MELTED(5) | |
| 12 | 18 | 55 | 35 | MELTED(2) | 160 | | 241 | 220 | MELTED(2) | 0.19 | 0.17 | 0.1 | 0.04 | MELTED(2) |
| 12 | 18 | 50 | 23 | 79 | 174 | | 229 | 260 | 205 | 0.24 | 0.17 | 0.12 | 0.1 | 0.05 |
| 39 | 40 | 30 | 84 | 43 | 160 | 155 | 165 | 260 | 200 | 0.24 | 0.2 | 0.2 | 0.08 | 0.08 |
| 79 | | | | | | | | | | | | | | |
| 19 | 63 | 63 | 229 | MELTED(6) | 250 | 250 | 290 | 460 | MELTED(6) | 0.3 | 0.2 | 0.1 | 0.08 | MELTED(6) |
| 10 | | 22 | 91 | MELTED | 240 | 193 | 259 | 270 | MELTED | 0.2 | | 0.08 | 0.06 | MELTED |
| 2 | 36 | | | 33 | 160 | | | | 230 | 0.2 | 0.2 | | | 0.06 |
| 22 | 31 | 16 | 25 | 19 | 140 | 170 | 193 | 175 | 175 | 0.2 | | 0.08 | 0.06 | 0.04 |
| 12 | 25 | 22 | 20 | 15 | 167 | 200 | 222 | 225 | 200 | 0.2 | 0.16 | 0.08 | 0.1 | 0.04 |
| 251 | MELTED | | | | 260 | MELTED | | | | 0.7 | MELTED | | | |
| 120 | MELTED | | | | 375 | MELTED | | | | | | | | |
| 16 | 46 | 32 | 74 | MELTED(4) | 200 | 250 | 245 | 250 | MELTED(4) | 0.28 | 0.3 | 0.12 | 0.1 | MELTED(4) |
| 50 | 46 | 51 | MELTED | 390 | 180 | 295 | 360 | MELTED | 475 | 0.34 | 0.32 | 0.26 | MELTED | MELTED |
| 110 | 165 | MELTED(3) | | | 220 | | 315 | MELTED(5) | | 0.32 | | 0.14 | MELTED(5) | |
| 20 | 20 | 80 | MELTED(5) | | 190 | | 235 | 217 | MELTED(5) | 0.18 | | 0.12 | 0.04 | MELTED(5) |
| 4 | | 46 | 32 | MELTED(5) | 340 | | | | | 0.48 | | | | |
| 201 | MELTED(1) | MELTED(3) | | | 150 | MELTED(1) | MELTED(3) | | | MELTED(1) | MELTED(1) | MELTED(3) | | |
| 143 | 287 | | | | | 270 | | | | 0.19 | 0.2 | | | |

BEARING WEAR PROPERTIES AT HIGH LOADS AND LOW SPEEDS

| TEST # | POLYMERIC MATRIX | COMMERCIALLY AVAILABLE COMPETETIVE MATERIALS (PREBLENDED) | COMPOSITIONS ||||| 
|---|---|---|---|---|---|---|---|
| | | | POLYMERIC MATRIX MATERIALS USED FOR EXEMPLARY COMPOSITIONS | % | FIRST ADDITIVE | % | SECOND ADDITIVE(S) |
| 86 | PEI | | ULTEM 1010 | 55 | DKD FIBER | 30 | TFE FIBER |
| 87 | PEI | | ULTEM 1010 | 50 | DKD FIBER | 25 | BN PLATELETS |
| 88 | PEI | | ULTEM 1010 | 30 | DKD FIBER | 60 | BN PLATELETS |
| 89 | PEI | | ULTEM 1040 | 28 | DKD FIBER | 70 | DC4-7105 |
| 90 | PEI | ULTEM 7201 | | 80 | CARBON FIBER | 20 | |
| 91 | PEEK | | VICTREX 150 | 55 | DKD FIBER | 30 | TFE FIBER |
| 92 | PEEK | | VICTREX 150 | 50 | DKD FIBER | 25 | BN PLATELETS |
| 93 | PEEK | | VICTREX 150 | 29 | DKD FIBER | 70 | CAPOW L38/H |
| 94 | PEEK | | VICTREX 150 | 48 | DKD FIBER | 25 | BN PLATELETS/DC4-7105 |
| 95 | PEEK | | VICTREX 150 | 48 | DKD FIBER | 25 | BN PLATELETS/DC4-7105 |
| 96 | PEEK | VICTREX FC30 | | 70 | CARBON FIBER | 10 | GRAPHITE POWDER/TFE POWDER |
| 97 | PEEK | VICTREX CA30 | | 70 | CARBON FIBER | 30 | |
| 98 | PPS | | TICONA 020584 | 28 | DKD FIBER | 70 | DC4-7105 |
| 99 | PPS | | TICONA 020584 | 30 | DKD FIBER | 10 | GRAPHITE POWDER |
| 100 | PPS | OL 4040 | | 80 | | | TFE POWDER |

BEARING WEAR PROPERTIES AT HIGH LOADS AND LOW SPEEDS

| % | METHOD OF BLENDING | WEAR (K) | SHAFT TEMPERATURE (F) | COEFFICIENT OF FRICTION |
|---|---|---|---|---|
| 15 | SOLVENT | 15 | 280 | 0.2 |
| 25 | SOLVENT | 38 | 160 | 0.32 |
| 10 | SOLVENT | 28 | 170 | 0.3 |
| 2 | SOLVENT | 9 | 143 | 0.13 |
| | PREBLEND | MELTED | MELTED | MELTED |
| 15 | DRY | 33 | 230 | 0.06 |
| 25 | DRY | 20 | 180 | 0.09 |
| 1 | DRY | 19 | 210 | 0.1 |
| 25/2 | DRY | 20 | 250 | 0.1 |
| 25/2 | DRY | 11 | 180 | 0.16 |
| 10/10 | PREBLEND | MELTED | MELTED | MELTED |
| | PREBLEND | MELTED | MELTED | MELTED |
| 2 | CONCENTRATE | 33 | 250 | 0.17 |
| 60 | CONCENTRATE | 124 | 250 | 0.36 |
| 20 | PREBLEND | MELTED | MELTED | MELTED |

FIG. 5B

| ADDITIVE | THERMAL CONDUCTIVITY (W/m°C) |
|---|---|
| ALUMINUM FLAKE | 204 |
| BORON NITRIDE POWDER | 33-200 |
| BRONZE POWDER | 26 |
| GRAPHITE POWDER | |
| STEEL FIBER | 52 |
| STAINLESS STEEL FIBER | 12-22 |

FIG. 6

|  | COMPOSITION | | | | | | WEAR (K) | SHAFT TEMP (°F) | CO-EFFIC-IENT OF FRIC-TION | TEST DURATION (HRS.) |
|---|---|---|---|---|---|---|---|---|---|---|
| POLYMERIC MATRIX MATERIAL | FIRST ADDITIVE | SECOND ADDITIVE | % BY VOLUME | % BY WEIGHT | TYPE OF CARBON FIBER | METHOD OF BLENDING | | | | |
| PEI ULTEM 1040 | DKD |  | 70/30 | 57.5/42.5 | PITCH | SOLVENT | 26 | 175 | 0.34 | 24 |
| PEI ULTEM 1040 | DKD |  | 60/40 | 46/54 | PITCH | SOLVENT | 37 | 163 | 0.22 | 24 |
| PEI ULTEM 1040 | AGM 94 |  | 70/30 | 62/38 | PAN | SOLVENT | 206 | 360 | 0.44 | 24 |
| PEI ULTEM 1010 | AGM 94 |  | 60/40 | 51/49 | PAN | SOLVENT | 366 | 205 | 0.4 | 26 |
| PEI ULTEM 1010 | AGM 94 |  | 50/50 | 41/59 | PAN | SOLVENT | 210 | 280 | 0.4 | 24 |
| PEI ULTEM 1040 | AGM 95 |  | 50/50 | 40/60 | PITCH | SOLVENT | 180 | 290 | 0.34 | 24 |
| PEI ULTEM 1040 | AGM 94 |  | 43/57 | 35/65 | PAN | SOLVENT | 530 | 200 | 0.44 | 24 |
| PEI ULTEM 1010 | AGM 94 | BN PLATELETS | 60/20/20 | 49/23/28 | PAN | SOLVENT | 10,000+ | 260 | 0.46 | 0.16 |
| PEI ULTEM 1040 | VMX-24 | BN PLATELETS | 60/20/20 | 48/24/28 | PITCH | SOLVENT | 10,000+ | 229 | 0.5 | 1 |
| PEI ULTEM 1040 | VMX-24 |  | 60/40 | 50/50 | PITCH | SOLVENT | 112 | 370+ | 0.7 | 21 |
| PEEK | DIALEAD K223 HG | BN PLATELETS | 60/40 | 48/52 | PITCH | DRY | 12 | 140 | 0.14 | 24 |
| PPS | DKD |  | 60/40 | 48/52 | PITCH | DRY | 24 | 225 | 0.3 | 24 |

| Resin | Filler 1 | Filler 2 | Ratio A | Ratio B | Type | Process | Col8 | Col9 | Col10 | Col11 |
|---|---|---|---|---|---|---|---|---|---|---|
| PPS | DIALEAD K223 HG | BN PLATELETS | 64/18/18 | 50/25/25 | PITCH | DRY | 6 | 125 | 0.22 | 24 |
| PPS | FORTAFIL | | | | PAN | DRY | 599 | 253 | 0.36 | 24 |
| PPS | DIALEAD K223 HG LF | BN PLATELETS | 60/20/20 | | PITCH | DRY | 6 | 180 | 0.36 | 24 |
| PC | DKD | BN PLATELETS | 60/20/20 | 47/27/27 | PITCH | SOLVENT | 70 | 141 | 0.16 | 24 |
| PC | GM 130 | BN PLATELETS | 60/20/20 | 48/23/29 | PAN | SOLVENT | 9875 | 300 | 0.36 | 2 |
| PEI ULTEM 1040 | DKD | | 87.5/12.5 | 80/20 | PITCH | SOLVENT | 57 | 195 | 0.24 | 24 |
| PEI ULTEM 1010 | DKD | | 64/36 | 50/50 | PITCH | SOLVENT | 24 | 190 | 0.26 | 100 |
| PEI ULTEM 1010 | DKD | | 54/46 | 40/60 | PITCH | SOLVENT | 38 | 176 | 0.34 | 24 |
| PEI ULTEM 1010 | DKD | | 43/57 | 30/70 | PITCH | SOLVENT | 29 | 158 | 0.24 | 100 |
| PEI ULTEM 1010 | DKD | BN PLATELETS | 43/49/8 | 30/60/10 | PITCH | SOLVENT | 12 | 174 | 0.24 | 100 |
| PEI ULTEM 1010 | DKD | BN PLATELETS | 64/18/18 | 50/25/25 | PITCH | SOLVENT | 12 | 160 | 0.18 | 100 |

FIG. 7B

| PRODUCT NAME | SUPPLIER | TYPE OF FIBER | Tc (W/mC) | DENSITY (gm/cc) | AVERAGE DIAMETER (MICRONS) | AVERAGE LENGTH (MICRONS) | ASPECT RATIO |
|---|---|---|---|---|---|---|---|
| DKA | BPAMOCO CORPORATION | PITCH | 900 | 2.2 | 10 | 200 | |
| DKD | BPAMOCO CORPORATION | PITCH | 600 | 2.2 | 10 | 200 | |
| VMX-24 | BPAMOCO CORPORATION | PITCH | 22 | 1.9 | 11 | 200 | |
| AGM 94 | ASBURY GRAPHITE MILLS | PAN | | 1.81 | 7 | 150 | |
| AGM 95 | ASBURY GRAPHITE MILLS | PITCH | | 1.91 | 11 | 200 | |
| FORTAFIL 382 | FORTAFIL FIBERS INC. | PAN | | 1.8 | 7 | 175 | |
| FORTAFIL 482 | FORTAFIL FIBERS INC. | PAN | | 1.8 | 7 | 175 | |
| GRAFIL GM130E | GRAPHIL INC. | PAN | 7 | 1.8 | 7 | 130 | |
| PYROFIL TR50S | GRAPHIL INC. | PAN | 7 | 1.82 | 7 | 8000 | |
| DIALEAD K 6371M | MITSHUBISHI CHEMICAL AMERICA | PITCH | 140 | 2.1 | 7 | 50 | |
| DIALEAD K 223HG LG | MITSHUBISHI CHEMICAL AMERICA | PITCH | 540 | 2.2 | 7 | 6000 | |
| DIALEAD K 223HG | MITSHUBISHI CHEMICAL AMERICA | PITCH | 540 | 2.2 | 7 | 300 | |

COMPARATIVE COMPOSITIONS

| TEST # | POLYMERIC MATRIX | POLYMERIC MATRIX MATERIALS USED FOR COMPARATIVE COMPOSITIONS | % | FIRST ADDITIVE | % | SECOND ADDITIVE(S) | % |
|---|---|---|---|---|---|---|---|
| 101 | PEI | ULTEM 1010 | | ALUMINUM FLAKE | 16 | | |
| 102 | PPS | | 65 | ALUMINUM FLAKE | | BN PLATELETS | 19 |
| 103 | PEI | ULTEM 1010 | 60 | BRONZE POWDER | 40 | | |
| 104 | PEI | ULTEM 1040 | 60 | BRONZE POWDER | 20 | GRAPHITE FLAKE | 20 |
| 105 | PEI | ULTEM 1040 | 60 | STEEL FIBER | 20 | BN PLATELETS | 20 |
| 106 | PC | | 81 | STAINLESS STEEL FIBER | 19 | | |
| 107 | PEI | ULTEM 1010 | 60 | | | BN PLATELETS | 40 |
| 108 | PEI | ULTEM 1010 | 64 | AGM 3243 GRAPHITE | 36 | | |

| WEAR PROPERTIES | | | |
|---|---|---|---|
| WEAR (K) | SHAFT TEMPERATURE (°F) | COEFFICIENT OF FRICTION | TEST DURATION (HRS) |
| 4400 | 150 | <0.7 | 0.03 |
| <10000 | 170 | 0.48 | 1 |
| 935 | 240 | 0.45 | 24 |
| 225 | 215 | 0.42 | 24 |
| 969 | 245 | 0.5 | 18 |
| 657 | 241 | 0.54 | 10.5 |
| 10,324 | 240 | 0.46 | 0.31 |
| 167 | 190 | 0.34 | 40 |

FIG. 9B

| MATRIX | % WGT. | FIBER | % WGT. | FILLER | % WGT. | IN-PLANE | THRU-PLANE | IN-PLANE |
|---|---|---|---|---|---|---|---|---|
| XYDAR 96403 LCP | 40 | DKD | 60 | | | 2.85 | 5.13 | |
| XYDAR 96403 LCP (REPROCESSED) | 40 | DKD | 60 | | | 2.94 | 6.83 | |
| PPS | 40 | | | ALUMINUM FLAKE | 60 | 8.58 | 8.13 | |
| PPS | 30 | | | ALUMINUM FLAKE | 70 | 14.98 | 15.12 | |
| PPS | 20 | | | ALUMINUM FLAKE | 80 | 20 | 21.7 | |
| PPS | 40 | DKD | 30 | ALUMINUM FLAKE | 30 | 4.5 | 5.36 | |
| PPS | 50 | DKD | 50 | | | 2.52 | 4.65 | |
| PPS | 40 | DKD | 60 | | | 2.92 | 7.36 | |
| PPS | 30 | DKD | 70 | | | 5.38 | 9.5 | |
| PPS | 50 | | | BORON NITRATE | 50 | 0.8 | 1.1 | |
| PEI | 55 | DKD | 25 | TEFLON FLOCK | 25 | 0.99 | 1.6 | |
| PEEK | 50 | DKD | 25 | BORON NITRIDE | 25 | 1.15 | 2.86 | |

| FIG. 10A |
|---|
| FIG. 10B |

| | | | | | | | | |
|---|---|---|---|---|---|---|---|---|
| PPS | 50 | | | | | | | |
| PEEK | 30 | DKD | 70 | | | | | |
| PEEK | 50 | | | BORON NITRIDE | 50 | 1.69 | 2.1 | |
| PPS | 50 | | | ALUMINUM FLAKE | 50 | 1.76 | 2 | 4.79 |
| XYDAR 96403 LCP | 40 | DKD | 60 | ALUMINUM FLAKE BORON NITRIDE | 25/25 | | | 1.97 |
| PEI | 50 | DKA | 50 | | | 4.39 | 10.5 | 1.44 |
| PEI | 50 | DKD | 25 | BORON NITRIDE | 25 | | | 1.56 |
| FERRO 511TG 72001 PEN | 40 | BN PWD | 60 | | | | | 3.82 |
| PEI | 70 | DKA | 30 | | | | | 0.82 |
| PEI | 60 | DKA | 40 | | | | | 1.03 |
| PEI | 40 | DKA | 60 | | | | | 2.51 |

FIG. 10B

TRIBOLOGICAL MATERIALS AND STRUCTURES AND METHODS FOR MAKING THE SAME

RELATED CASES

Priority under 35 U.S.C. §119(e) is hereby claimed to U.S. Provisional Patent Application Nos. 60/222,107 and 60/222,108 to Mack, Edward J., filed on Jul. 28, 2000, each of which is incorporated herein by reference in its entirety.

TECHNICAL FIELD

The present application is related to tribological materials and structures, and methods of making the same and in particular, to plastic bearings and methods of making the same.

BACKGROUND AND RELATED ART

The field of tribology deals with the science of interacting surfaces in relative motion. Tribology generally involves the study of friction, wear, and lubrication in relation to such surfaces. Tribological materials are generally characterized by a variety of parameters including, inter alia, wear, load and velocity carrying capacity, coefficient of friction, coefficient of expansion, stiffness, and dimensional stability.

Early tribological materials used in applications where wear resistance and low friction was desired in sliding interfaces were generally metal such as brass, bronze, and other metal alloys, and woods, especially hard woods. The limitations of these materials for friction and wear applications are well known and include the need for constant lubrication, heavy weight, rapid wear, high expense of fabrication, and other problems. These problems drove the development of plastic tribological materials for bearing applications, which to a certain extent addressed some of these limitations.

Plastic bearings are generally made by incorporating additives such as fillers, reinforcement materials, and/or solid lubricants to a polymeric material. The tribological and other properties of such materials depend on the particular polymeric matrix utilized as well as the particular fillers, reinforcements and lubricants compounded with the polymeric matrix material.

Plastic bearings have replaced other materials in many applications because they have high weight to strength ratios and can be made self-lubricating, among other desirable characteristics. Although plastic bearings are important in many applications, their use has been limited in some instances. For example, the use of plastic bearings in high performance applications involving high loads or high velocities has been limited because under such extreme conditions of load or velocity, plastic bearings are generally prone to failure due to the high frictional heat generated. The high frictional heat generated causes softening and melting of the polymeric matrix material. In addition, there are many applications in which plastic bearings generate an unpleasant squeal, as well as excessive heat.

The "wear" of a material generally refers to the amount of material removed from a bearing surface as a result of the relative motion of the bearing surface against a surface with which the bearing surface interacts. The wear of a material is generally reported as a "wear factor" or "K-factor." As a relative measure of the performance of materials under the same operating conditions, K-factors have proven to be highly reliable.

The load and velocity bearing capability of a material is generally considered that combination of load and speed at which the coefficient of friction or the temperature of a bearing surface fails to stabilize. As used herein, the term "PV limit" will be used to denote the pressure-velocity relationship determined by the combination of load and speed at which the coefficient of friction or the temperature of a bearing surface fails to stabilize, expressed by the product of the unit pressure P (psi) based upon the projected bearing area and the linear shaft velocity V (FPM).

Any improvement in the tribological properties of plastic bearing is desirable.

SUMMARY

The compositions and articles of the present invention have substantially and unexpectedly improved tribological characteristics in comparison to other commercially available plastic materials, including improved wear characteristics, reduced coefficient of expansion, low temperature generation, reduced K-factors, increased stiffness, and improved dimensional stability. Moreover, it is possible to mold thicker shapes and to hold closer molding tolerances using the compositions of the present invention, in comparison to other plastic compositions.

One embodiment is directed to a plastic article having a bearing surface. the article includes a polymeric matrix material and a first additive that is a lubricious reinforcing fiber having a thermal conductivity of at least about 50 W/m° K. In some embodiments, the article includes a second additive that is preferably lubricious.

In another embodiment the article includes a polymeric matrix material, and about 5 percent to about 75 percent by weight of a first additive having a density of at least about 2.0 gm/cm$^3$. In this embodiment, the plastic article has a wear factor of less than about 200 under a load of about 200 psi and a velocity of about 50 feet per minute.

In another embodiment the article includes a polymeric matrix material selected from the group consisting of polyamideimide, polyetherimide, polyimide, polyetheretherketone, polyphenylene sulfide, liquid crystal polymer, and combinations thereof and about 5 percent to about 75 percent by weight of a first additive selected from the group consisting of Thermalgraph DKD fibers, Thermalgraph DKA fibers, Dialead K223HG fibers, and combinations thereof. In this embodiment, the plastic article has a wear factor of less than about 200 under a load of about 200 psi and a velocity of about 50 feet per minute.

In another embodiment the article includes a polymeric matrix material, and about 2 percent to about 75 percent by weight of a first additive having a density of at least about 2.0 gm/cm$^3$, and about 2 percent to about 75 percent by weight of a second additive. In this embodiment, the plastic article has a wear factor of less than about 200 under a load of about 200 psi and a velocity of about 50 feet per minute.

In another embodiment the article includes a polymeric matrix material selected from the group consisting of polyamideimide, polyetherimide, polyimide, polyetheretherketone, polyphenylene sulfide, liquid crystal polymer, and combinations thereof, about 2 percent to about 75 percent by weight of a first additive selected from the group consisting of Thermalgraph DKD fibers, Thermalgraph DKA fibers, Dialead K223HG fibers, and combinations thereof, about 2 percent to about 75 percent by weight of a second additive selected from the group consisting of boron nitride, carbon, graphite, molybdenum disulfide, talc, tetrafluoroethylene, and combinations thereof. In this embodiment, the plastic article has a wear factor of less than about 200 under a load of about 200 psi and a velocity of about 50 feet per minute.

In yet another embodiment the article includes a polymeric matrix material, a lubricious reinforcing first additive, and a lubricious second additive. In this embodiment, the article has a wear factor of less than about 25 under a load of about 200 psi and a velocity of about 50 feet per minute.

Another aspect is directed to a method of forming a bearing composition. The method involves forming a solution of a polymeric matrix material and a first additive, and evaporating the solvent.

Another aspect is directed to an additive for a polymeric matrix material containing a lubricious reinforcing first additive and a lubricious second additive.

Another embodiment is directed to a plastic article having a bearing surface. The article includes a polymeric matrix material and a first additive that is a lubricious carbon fiber having a thermal conductivity of at least about 50 W/m° K.

Another embodiment is directed to a plastic article having a bearing surface. The article includes a polymeric matrix material, a first additive that is a lubricious carbon fiber having a thermal conductivity of at least about 50 W/m° K, and a lubricious second additive.

Another embodiment is directed to a plastic article having a bearing surface. The article includes a polymeric matrix material, a first additive that is a lubricious carbon fiber having a thermal conductivity of at least about 50 W/m° K, and a lubricious second additive selected from the group consisting of boron nitride, carbon, graphite, molybdenum disulfide, talc, tetrafluoroethylene, and combinations thereof.

The industries in which the articles of the present invention may be used include aircraft, automotive, textiles, computers, military, chemical, appliances, etc. Specific applications include vane bushings in jet engines; valve seats in high pressure chemical valves; picker finger in copiers and printers; piston rings and valve guides in non lubricating air compressors; compressor vanes in rotary compressors and vacuum pumps; seals in automotive transmissions, especially trucks and tractors; piston and seals in refrigeration equipment; components in aviation flight control actuators; bearings in watt-hour meters; components in missiles; bushings in textile weaving equipment; chemical pumps; windshield wiper bushings; power steering units; air break piston rings; splines; and components in small internal combustion engines.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which:

FIG. 2 is a table (Table 1) listing the Limiting PV of various plastic compositions under typical test conditions for plastic bearings;

FIG. 3 is a table (Table 2) listing the wear properties of various plastic compositions under typical test conditions for plastic bearings;

FIG. 4 is a table (Table 3) listing the wear properties of various plastic compositions at high PVs;

FIG. 5 is a table (Table 4) showing the comparative wear, shaft temperature, and coefficient of friction of various plastic compositions under extreme test conditions of high loads and low speeds;

FIG. 6 is a table (Table 5) showing the relative thermal conductivity of certain additives;

FIG. 7 is a table (Table 6) showing the wear, shaft temperature, and coefficient of friction of compositions containing the additives;

FIG. 8 is a table (Table 7) showing the characteristics of various carbon fibers;

FIG. 9 is a table (Table 8) showing the wear, shaft temperature, and friction of various compositions that include the carbon fibers shown in Table 8; and FIG. 10 is a table (Table 9) showing the comparative thermal conductivities of a variety of compositions.

DETAILED DESCRIPTION OF THE PREFERRED EMBODIMENTS

Figure 1A:
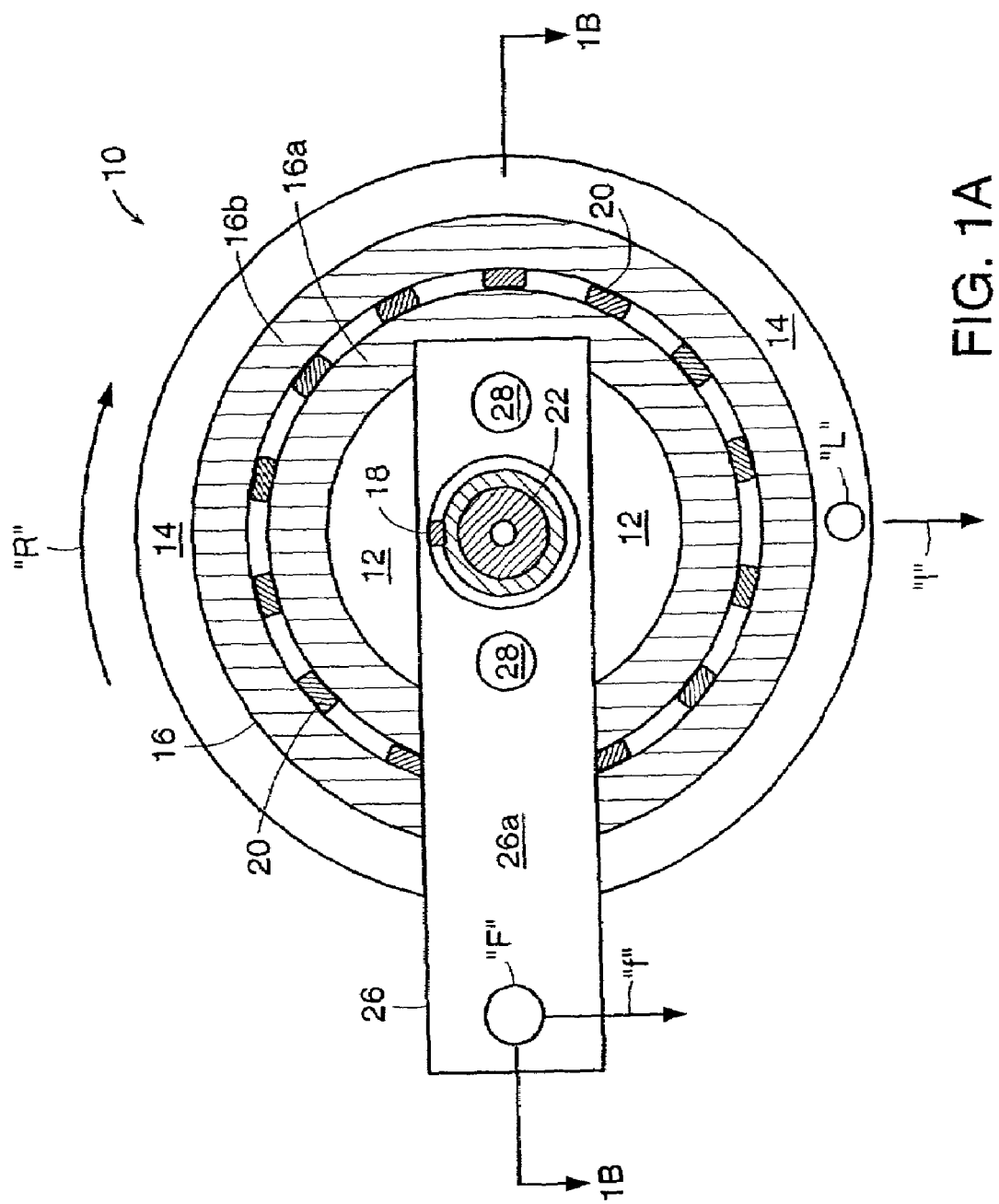
FIG. 1A is a top view of a bearing test apparatus.

The present invention involves the discovery that plastic structures formed from compositions that include certain types of additives provide substantially and unexpectedly improved tribological properties such as low wear, low friction, low temperature generation and high limiting PVs in comparison to other plastic structures. Such structures provide exceptionally high limiting PVs at extreme conditions of low pressure and high velocity, as well as high pressure and low velocity. Preferably, the present compositions and structures also provide a negative coefficient of expansion, improved dimensional stability, and greatly improved noise characteristics in comparison to other plastic structures.

The present compositions are useful for producing plastic structures such as, for example, bearings or articles with a bearing surface that are subjected to relatively high loads, relatively high speeds, or both. "Bearing," and "bearings," as used herein, refers to any article(s) having a surface that interacts with a surface in relative motion, for example, by sliding, pivoting, oscillating, reciprocating, rotating, or the like. Examples of such articles include, but are not limited to, sleeve bearings, journal bearings, thrust washers, rub strips, bearing pads, ball bearings, including the balls, valve seats, piston rings, valve guides, compressor vanes, and seals, both stationary and dynamic.

As discussed previously, a variety of materials may be added to the polymeric matrix materials to provide or enhance the tribological properties of the polymeric matrix material. The selection of additives to improve tribological properties has been and continues to be difficult, as an additive that provides or enhances one desirable tribological property, such as lubricity, may degrade another desirable characteristic, such as wear. Although not wishing to be bound by any theory, it is theorized that an additive that provides both lubricity and structural reinforcement may contribute to the improved tribological properties evident in the present compositions and structures.

According to one embodiment, the present structures and compositions preferably include a continuous phase of at least one polymeric material and a dispersed phase including a first additive that provides both lubricity and structural reinforcement when added to a polymeric material. "Continuous phase," as used herein, refers to the major component of the composition and "dispersed phase," as used herein, refers to the minor component of the composition, which may or may not be uniformly dispersed in the continuous phase. Generally, the major component is the polymeric matrix material and the minor component is the additive(s).

For purposes of the present compositions and structures, any material that provides both structural reinforcement and lubricity to a polymeric matrix material to which it is added may be included within the definition of "first additive." Generally, polymeric matrix materials may be reinforced structurally by including reinforcing agents in the polymeric matrix material and may be made more lubricious by including certain lubricious materials, such as solid lubricants, thermal insulators, or highly electronegative polymeric materials such as tetrafluoroethylene. As used herein, the term "thermal insulator" will refer to a material having a thermal conductivity of less than about 0.5 W/m° K. Reinforcing agents are well known to those of ordinary skill in the art, and may have a variety of shapes and sizes, including fibers. For purposes of the present compositions and structures, as used herein, a "lubricious" material means any material that when added to a polymeric matrix material will improve the tribological properties of the resulting plastic material by, for example, decreasing the coefficient of friction, increasing the wear resistance, generating less heat under high loads, and any combination thereof.

Those of ordinary skill in the art will recognize that it is not necessary for the lubricious component and the reinforcing component of the additive to be a unitary structure. For example, any reinforcing agent that has been coated with a lubricious material may be considered useful as the first additive for the present compositions and structures provided it improves the tribological characteristics of the polymeric matrix material.

In preferred embodiments, the first additive may be a lubricious reinforcing fiber. "Fiber," and "fibrous material," as used herein, means a fundamental form of solid (often crystalline) characterized by relatively high tenacity and an extremely high ratio of length to diameter. Although preferred, the first additives are not limited to fibrous materials.

Those of ordinary skill in the art will recognize that lubricity has been and remains a material characteristic that is difficult to quantify and/or qualify. Examples of suitable lubricious materials include, but are not limited to, solid lubricants, thermal insulators, or highly electronegative polymeric materials such as tetrafluoroethylene. Examples of lubricious materials include tetrafluoroethylene (TFE), molybdenum disulfide, carbon, graphite, talc, and boron nitride, in any shape and in any combination thereof. "Solid lubricant," as used herein, and as generally used, means a material having a characteristic crystalline habit which causes it to shear into thin, flat plates, which readily slide over one another and thus produce an antifriction or lubricating effect, for example, mica, graphite, molybdenum disulfide, talc, and boron nitride. Such solid lubricants may be useful as the lubricous component of the first additives in some instances, but those of ordinary skill in the art will recognize that when used alone, they generally do not provide the greatly improved wear performance of the present compositions and structures, nor do they always provide structural reinforcement. Moreover, the first additives are not limited to those that obtain their lubricity from solid lubricants.

Examples of materials that have been found suitable for use as the first additive in the present compositions and structures include, but are not limited to, materials having tensile strength of greater than about 200 KSI, a tensile modulus of greater than about 100 MSI, and a density of greater than about 2.0 gm/cm³. In preferred embodiments, the first additives also have a thermal conductivity ($T_c$) of greater than about 400 W/m° K in the axial direction, and a coefficient of thermal expansion (CET) of about −1.4 ppm/° C.

One preferred material for use as the first additive may be a graphitized pitch-based carbon fiber. The fibers may be continuous, discontinuous, milled, chopped, and combinations thereof. Generally, as the degree of graphitization of a carbon fiber increases, so does the density and the thermal conductivity of the carbon fiber. Pitch-based carbon fibers are preferred as the first additive because they generally have a relatively higher graphite content than polyacrylonitrile (PAN) carbon fibers and are consequently more highly lubricious than PAN carbon fibers. Pitch-based carbon fibers and methods of production are disclosed, inter alia, in U.S. Pat. Nos. 5,552,098; 5,601,794; 5,612,015; 5,620,674; 5,631,086; 5,643,546; 5,654,059; 5,705,008; 5,721,308; and 5,750,058. Examples of graphitized pitch-based carbon fibers that have been found suitable in the present structures and compositions include Dialead K 223HG and Dialead K 223HG LG (hereinafter "HG" and "LG," respectively, both available from Mitsubishi Chemical America) and Thermalgraph® DKD and DKA (hereinafter "DKD" and "DKA," respectively, both available from BPAmoco). These fibers are generally characterized by a relatively high concentration of graphite crystals which are oriented axially in the fibers.

The DKD fibers have a tensile strength of greater than about 200 KSI, a tensile modulus ranging from about 100 to about 135 MSI, a density ranging from about 2.15 to about 2.25 gm/cm³, a $T_c$ ranging from about 400 to about 700 W/m° K, a carbon assay of 99+ percent, and a CET of about −1.445 ppm/° C. The DKD fibers also have a diameter of about 10 microns and a length distribution in which less than 20 percent of the fibers are less than 100 microns and less than 20 percent of the fibers are greater than 300 microns.

The DKA fibers have a tensile strength of greater than about 350 KSI, a tensile modulus ranging from about 130 to about 145 MSI, a density ranging from about 2.15 to about 2.25 gm/cm³, a $T_c$ ranging from about 700 to about 1100 W/m° K, a carbon assay of 99+ percent, and a CET of about −1.45 ppm/° C. The DKA fibers also have a an average diameter of about 10 microns and an average length of about 200 microns.

The HG and LG fibers have a tensile strength of greater than about 450 KSI, a tensile modulus of greater than about 130 MSI, a density of about 2.2 gm/cm³, a $T_c$ of about 540 W/m° K, and an average diameter of about 7 microns. In addition to the foregoing, the HG fibers have an average length of about 300 microns; the LG fibers have an average length of about 6000 microns.

As shown above, the graphitized pitch-based carbon fibers typically have relatively high $T_c$ in comparison to other carbon fibers, including PAN carbon fibers, as a result of the increased graphite content. The increased graphite content also increases the $T_c$ of the plastic structures formed from compositions including such fibers, which may be desirable in any application in which the transfer of heat is important, as is the case in many bearing applications. Thus, for applications in which the dissipation of heat is important, the first additives preferably have a $T_c$ of at least about 50 to about 1500 W/m° K, more preferably about 200 to about 1000 W/m° K, and more preferably still about 400 to about 800 W/m° K, in the axial direction. Additives having a higher $T_c$ may be used, but they typically become more expensive as the $T_c$ increases due to processing costs. Moreover, additives having a higher $T_c$ do not necessarily provide corresponding increases in the wear performance of the present compositions and structures. Examples of materials that may have relatively high lubricity and relatively high $T_c$ include, but are not limited to, the foregoing pitch-based carbon fibers, pitch-based graphitized carbon fibers, boron nitride flakes and fibers, and any combinations thereof.

There are no constraints on the type of polymeric material that may be used in the present structures and compositions, other than those related to practical considerations such as the processing methods used for the compositions and/or the application in which the plastic structure may be used. The polymeric matrix materials suitable for use in the present compositions may be in any form such as granules, pellets, and the like. Thus, any polymeric matrix material may be used for the present compositions and structures, whether thermoplastic or thermosetting. The thermoplastic polymeric materials may be amorphous, crystalline, semi-crystalline, and any combination thereof. Examples of polymeric matrix materials that may be used in the present structures and compositions include, but are not limited to, acetals, acrylics, flouropolymers, ketone-based polymers, liquid crystal polymers (LCP), phenolics, polyamides (nylons) (PA), polyamideimide (PAI), polyarylate, polybutylene terephthalate (PBT), polycarbonate (PC), polyetherimide (PEI), polyethylene (PE), polyethylene naphthalate (PEN), polyethylene terephthalate (PET), thermoplastic polyimide (TPI), polyphenylene sulfide (PPS), polypropylene (PP), silicones, sulfone-based polymers, and combinations thereof. As stated previously, the polymeric matrix material may be a blend of at least two polymeric matrix materials.

Many "commodity" polymeric materials that are generally not suited for bearing applications may be improved when combined with the foregoing additives. In addition, polymeric materials that may be used for less critical bearing applications may be improved when combined with the foregoing additives such that they would be suitable for more critical bearing applications. Some polymeric materials that have improved tribological properties when combined with the foregoing additives include PAI, polysulfones, and combinations of PEEK, PEI, PPS, TPI, and LCP.

For high performance bearing applications, it is preferred that the polymeric matrix material may be selected from the group of "engineering" polymers, which are generally relatively high flow, thermoplastic polymers and combinations of polymers. Examples of high flow, polymeric matrix materials include, but are not limited to, nylons, acetals, polycarbonate, ABS, PPO/styrene, polybutylene terephthalate, and combinations thereof.

Examples of polymeric matrix materials that have been found suitable for the present compositions when used to form high performance bearing structures include, but are not limited to, polyetheretherketone (PEEK), polyetherimide (PEI), polyphenylene sulfide (PPS), TPI, and LCP. Blends of TPI and LCP with other polymeric materials have been found suitable as well.

The compositions and structures of the present embodiment preferably include a sufficient amount of at least one of the first additives, by weight, to provide the desired tribological properties for the application in which the structure may be used. In theory, the upper limit of the first additive that may be included in the composition is limited only by practical considerations, such as the amount of polymeric matrix material required to bind the material together, or the method of blending the materials. Throughout this document, all percentages indicated are by weight based on the total weight of the composition or structure. Generally, compositions and structure containing at least about 5 percent, by weight, of the first additive, have been found to provide an improvement in at least one of the foregoing characteristics in comparison to that of the polymer matrix without the first additive. Preferably, the present compositions and structures contain from at least about 5 percent to about 75 percent of the first additive, more preferably from at least about 30 percent to about 60 percent, and most preferably about 35 percent to about 55 of the first additive, by weight, based on the total weight of the composition. Obtaining concentrations of the first additive in percentages greater than about 40 to about 50 percent by weight has sometimes been problematic, as is well-known to those of ordinary skill in the art. Suitable methods for obtaining desired concentration levels, including concentrations levels greater than about 40 percent to about 50 percent by weight, are discussed in further detail below.

Thus, one embodiment is the provision of a plastic structure that includes a polymeric matrix material and a lubricious reinforcing additive, and a composition from which the plastic structure may be formed.

The tribological properties of the present compositions and structures may be further improved by the addition of a second additive. The polymeric materials and first additives suitable for use in the present embodiment are the same as those described above. The second additive provides the compositions and structures of the present embodiment with substantial improvements in a variety of tribological properties including, but not limited to, wear, friction resistance, temperature generation, and PV limits. The substantial improvements achieved with the preferred embodiments of the present invention have been surprising and unexpected. Suitable materials for the second additive include, but are not limited to, solid lubricants, thermal insulators, and electronegative fluorinated polymeric materials such as Kevlar and Teflon. Examples of the foregoing include tetrafluoroethylene (TFE), molybdenum disulfide, carbon, graphite, talc, and boron nitride, in any shape and in any combination thereof. Preferred second additives include TFE powder and TFE fiber (both available from DuPont Corporation), boron nitride (BN) powder (available from Carborundum), BN platelets, BN flakes, graphite powder, graphite flakes, and combinations thereof. Again, those of ordinary skill in the art will recognize that some of the second additives may be considered solid lubricants, but the second additives include any lubricious material, in any shape or size.

In the present embodiment, the compositions and structures preferably contain at least one polymeric material, from at least about 2 percent to about 75 percent of the previously described first additive, and from at least about 2 percent to about 75 percent of the second additive. The compositions and structures more preferably contain about 20 percent to about 60 percent of the first additive and about 20 percent to about 60 percent of the second additive; and most preferably contain about 15 percent to about 40 percent of the first additive and about 15 percent to about 40 percent of the second additive.

For exemplary bearing applications, it has been found that a composition or structure containing about 30 percent of at least one polymeric matrix material, about 60 percent of a first additive, and about 10 percent of a second additive, by weight, based on the total weight of the composition, provides the most desirable characteristics for use in, for example, high performance bearing structures. A particularly preferred embodiment includes about 30 percent PEEK, about 60 percent DKD, and about 10 percent boron nitride platelets, by weight, based on the total weight of the composition.

According to either embodiment, compositions containing the preferred ranges for the additives provide bearing compositions and structures with substantial improvements in all or most tribological properties. Again, it is possible to tailor the compositions and structures to maximize, for example, a specific desired tribological property by selecting an additive(s) and concentration range for the additive(s), which may not necessarily fall within the foregoing preferred ranges. Tailoring the compositions as desired may involve routine experimentation known to those of ordinary skill in the art.

According to either embodiment, additional materials may also be added during the blending stage to impart whatever properties such materials normally would be expected to impart to plastic materials. However, the amount of additional material that may be added to the composition may be limited due to the exceptionally high loading already achieved in the present compositions in order to achieve the desired wear performance. Examples of additional materials include flow rate enhancers, reinforcing fibers, colorants, and the like.

Thus, one embodiment is the provision of a plastic structure that includes a polymeric matrix material, a lubricious reinforcing additive, a lubricious second additive, and a composition from which the plastic structure may be formed.

In general, suitable blending techniques should be employed to maintain the integrity of the additives while ensuring homogeneity of the composition. Some fibrous materials, particularly the DKA and DKD fibers, are unusually sensitive to fiber break-down and present special problems in blending and molding. Moreover, the wear of a composition increases with the number of fiber ends contained in a composition and structure. Thus, it may be important to minimize breakage of fibers to minimize the number of fiber ends that are contained in a composition. Minimizing fiber breakage may also contribute to increased thermal conductivity, when the fibers are thermally conductive. Therefore several blending methods have been used to form the present compositions.

In addition to maintaining the integrity of the additives, the present blending methods provide concentrations of additive material(s) in a polymeric material that are substantially higher than obtained using other methods. For example, it has been generally difficult or impossible to make, using an extrusion method, moldable compounds having concentrations of additive material of greater than about 50 percent without adversely affecting the characteristics of the final polymeric material. Most likely this is because the wettability and dispersability of an additive material in the melt stage of a polymeric material is less than when the polymeric material is dissolved in a solvent. The wettability and dispersability of the additive material depends on the ability of the polymeric material to encapsulate and separate individual particles of additive material. As the wettability and dispersability of a additive material is increased, so is the effectiveness of the additive material, especially when attempting to increase the thermal conductivity of a polymeric material.

There are several methods which may be used to form useful compositions of the polymeric material and the additive material(s). One method may be particularly useful for polymeric materials that may be obtained in fine grinds. The fine grinds may be mixed in dry form at room temperature and tumbled to obtain a fairly uniform mixture. Thereafter, it is generally desirable to add the mixture to a pulverizing machine such as a hammer mill to grind and further mix the resinous components to ensure homogeneity. In practice, it has been found desirable to pass the mixture through a hammer mill pulverizer having a screen with apertures of about ⅛ inch diameter. The best results are typically achieved when the mixture is passed through the hammer mill at least once. Thereafter, the resulting dried polymeric material may be injection molded in tubular sections for testing, as described in further detail below.

Another method involves dissolving the polymeric material in a suitable solvent and then adding the additive(s) to the solution. The solution may be stirred, preferably very gently, until the additive(s) are completely wetted out, and continued until the solvent substantially evaporates. Evaporation of the solvent results in a relatively thick suspension of the additive(s) in the dissolved polymeric material. The suspension may be allowed to dry, for example, overnight in an oven at a temperature greater than ambient, for example, about 350 degrees Fahrenheit. Thereafter, the resulting dried polymeric material may be granulated and processed as desired.

Suitable solvents for use in the present method include methylene chloride (available from Dow Chemical Corporation) and N-methyl pyrrolidone (available from by BASF Corp). Both methylene chloride and N-methyl pyrrolidone have excellent wetting characteristics. Therefore, polymeric solutions of methylene chloride and N-methylene pyrrolidone effectively disperse, encapsulate, and separate individual particles of additive(s). In this manner, the present blending method provides polymeric materials with substantially higher additive concentrations than other methods. The present solvent blending method may be used to form compositions containing up to about 90 percent of the additive(s) by weight, based on the total weight of the composition.

Another method is a variation of the afore-mentioned solvent method, and is useful for polymeric matrix materials that are not soluble in ordinary solvents or may not be available in, for example, fine grinds. Generally, it has been difficult or impossible to blend large amounts of additive(s), especially fibrous material, with dry blended granules. Therefore, the present method solves the problem by forming a first solvent blend having a high concentration of additive(s) (typically about 60 percent to about 90 percent) from a polymeric matrix material that is compatible with the desired polymeric matrix material and adding the desired polymeric matrix material to the first solvent blend. For example, PEI is soluble in methylene chloride and is compatible with PI, LCP, PEEK, and PPS. Therefore, PEI may be selected as the polymeric matrix material to make the concentrated solvent blend. As described above, high concentrations of additive(s) may be dispersed in the solution of the polymeric matrix and solvent. The mixture then may be dried out and granulated. The granules can then be blended with, for example, PI, PEEK, LCP, and/or PPS, or any other desired polymeric matrix material. These blends of granules can be easily fed into, for example, an injection molding machine, which results in blending to the final compound.

Preferably, the concentration of additive(s) in the concentrates may be at least about 80 percent, more preferably at least about 85 percent, and more preferably still at least about 90 percent by weight. Preferred embodiments of the method provide concentrates having about 90% by weight of the foregoing preferred additive(s) materials.

An alternate blending method involves blending the polymeric material with the additive(s) using a twin screw extruder, which is well known to those of skill in the art. However, high sheer stresses in the twin screw extruder, which are good for mixing, may break down the length of the fibers. Therefore, in some instances, one of the previously described methods may be desired for blending the compositions. After extrusion, the solid polymeric material may be broken and granulated for further downstream processing such as injection molding processes. Thereafter, the resulting dried polymeric material may be processed as desired according to the intended application of the part.

The compositions, however obtained, are very useful and have exceptional properties, including wear, when molded to form an article having a bearing surface. This utility is substantially greater than the utility of the polymeric matrix material alone and substantially greater than other commercially available preblended plastic materials.

Test Methods

Standard test methods are known for testing bearing performance (see ASTM-3702, Thrust Washer Test). However, it has been found that the industry standard test methods are generally not stringent enough to predict the performance of bearing materials under many actual operating conditions. Therefore, the following test apparatus and methods were developed and were used to evaluate the present structures and compositions.

A representative technique for preparing test bearings involves preparing blanks by injection molding, followed by machining the test bearings from the injection molded blanks. The injection molding machine was a 28-ton Engle. The cavity molded a blank that had an O.D. of $23/32$ inches, an I.D. of $16/32$, and a length of $17/32$. The molding cycles were varied based on the polymeric matrix material and the amount of the additive(s). Typical molding cycles used for the present compositions were similar to those that would be used for each respective matrix material. The only significant difference was that very high inject and hold pressures were used to successfully mold parts from these highly filled compounds. Injection pressures as high as about 20,000 psi were used, whereas injection pressures of about 10,000 are typical. Hold pressures were also as high as about 20,000 psi, whereas about 8,000 psi is typical. All other parameters—barrel zone, nozzle, mold temperatures, and injection speeds were as one would expect for the polymeric matrix material. No back pressure was used, and gates and runners were larger than normal to allow the viscous compound to flow into the molds.

Using the foregoing technique, test bearings having the following dimensions were formed from a variety of compositions, as shown in the Examples below.

Figure 1B:
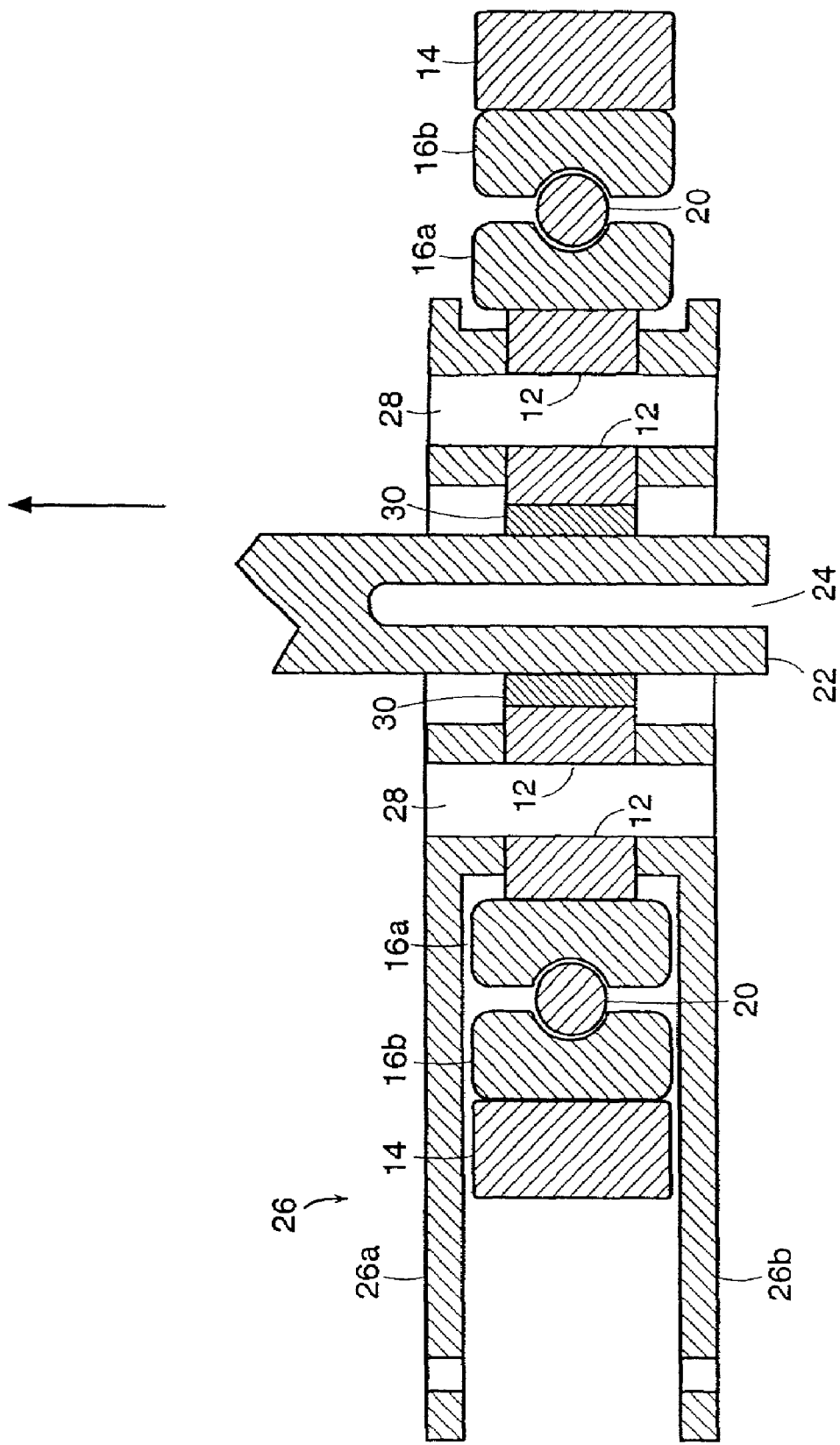
FIG. 1B is a cross-section through line 1B—1B of the test apparatus shown in FIG. 1A.

O.D.=0.689 (+0.002–0.000) inches
I.D.=0.504 (+0.002–0.000) inches
Length=0.500 (+0.010–0.000) inches Test Apparatus FIGS. 1A and 1B, taken together, illustrate an exemplary test apparatus 10 that was used to evaluate the present compositions and structures as well as those that are commercially available. Test apparatus 10 includes a cylindrical inner aluminum housing 12 and a cylindrical outer aluminum housing 14, with a cylindrical ball bearing assembly 16 disposed therebetween. A key 18 is connected to the inner housing 12 to prevent test bearings from rotating in inner housing 12. The ball bearing assembly 16 includes two spaced apart inner and outer races 16a, 16b between which a plurality of ball bearings 20 may be disposed for rotation therein. Inner housing 12 has the following dimensions:

O.D.=2.000" (+0.002–0.000)
I.D.=0.687 (+0.001–0.000)
Length=0.500 (+0.010–0.000)

A shaft 22 extends coaxially through inner housing 12 and is supported by a motor (not illustrated). Shaft 22 includes a central bore 24 into which a thermocouple (not illustrated) may be received for measuring the temperature of shaft 22. Shaft 22 was a ½ inch diameter mild steel shaft that was polished to a 16 finish and made adjustably rotatable by means of pulleys (not illustrated) connected to the motor. Shaft 22 may be attached to the motor in any suitable manner. A drive mechanism (not illustrated), such as a drive belt and pulleys, must be provided to accurately rotate shaft 22 at selected rotation rates in order to obtain the proper V (ft/min) for the particular test being run.

Inner housing 12, ball bearing assembly 16, and outer housing 14 are maintained in adjacent relation by a torque arm 26, through which the frictional force generated by the test bearing may be measured, as described below. Torque arm 26 includes an upper arm 26a and a lower arm 26b. Two bores 28 extend through upper arm 26a, inner housing 12, and lower arm 26b. Upper and lower arms 26a,b of torque arm 26 are connected and maintained in assembled relation by fasteners (not illustrated) that extend through bores 28.

Test set-up involves inserting a test bearing 30 into inner housing 12 as illustrated in FIGS. 1A and 1B, and mounting inner housing 12 onto shaft 22, which is fixed to the motor. Key 18 is then locked into inner housing 12 to prevent test bearing 30 from rotating in inner housing 12. Inner housing 12 and test bearing 30 are then inserted into ball bearing assembly 16 within outer housing 14. Upper and lower torque arms 26a,b are then fastened to the assembly with fasteners extending through bores 28.

During operation, a load is applied to test bearing 30 at "L" in the direction of the arrow "1" as shown in FIG. 1A. The load may be applied pneumatically or with dead weights (not shown), or any suitable method. The motor can now be started and the test begun.

Torque arm 18 may then be used to measure frictional force, as will be discussed below. A means of measuring the frictional force at the torque arm, such as a strain gage type load cell, or a force gauge is also needed but not illustrated in the drawing. A force gauge or load cell (not illustrated) may be attached to torque arm 26 at "F." Naturally, to resist the torque generated by the test sample bearing friction, and to effectively measure this frictional force, one end of the force gauge or load cell must be connected to the torque arm, and the other end must be somehow attached to solid ground, such as the lab bench. Of course, this also has the effect of preventing the test sample bearing, inner housing, and torque arm assembly from spinning freely. Thus, the load cell or force gage measures the frictional force generated through the torque arm.

During operation, the test bearing, inner housing, and torque arm are free to rotate with the inner race of the ball bearing assembly. The load is applied through the outer housing which is pressed to the outer race of the ball bearing assembly. The application of this load prevents the outer race of the ball bearing assembly and the outer housing from rotating. Thus, the inner race is free to rotate, along with the test bearing, inner housing, and torque arm assembly. Consequently, all the frictional force generated between the test bearing and the rotating shaft during the test is transmitted through the torque arm, and is resisted by the load cell or force gauge that is attached to the torque arm at "F" in FIG. 1A as shown.

Bearing Wear

The test procedure for determining wear involved weighing the test bearings and the inner aluminum housing before testing to the nearest milligram, and determining the weight loss of the bearing by weighing the bearing and the inner aluminum housing after testing. The weight loss of the test bearing assembly was then converted to volumetric units by relating it to the specific gravity of the polymeric material from which it was formed. The volume was then converted to 0.001" of wear by dividing by the projected area of $\frac{1}{4}$ in$^2$. The K-factor at 10,000 PV was determined by the formula:

$$K = \frac{\text{Wear}}{\text{PVT}}$$

Coefficient of Friction

The coefficient of friction was determined after the frictional force was measured at the point where it was measured on the torque arm. A correction factor was first applied to correct for the multiplication of the frictional force through the torque arm. The radial distance from the center of the shaft to the outside surface of the shaft (the surface where the frictional force is generated) is 0.250 inch. The length of the lever arm from the center of the shaft to the point where the frictional force is measured on the torque arm (as shown in FIG. 1) is 2.500 inches. Therefore, the force measured at the point indicated on the torque arm has to be multiplied by 10 to find the frictional force, where it is generated between the shaft and the test sample bearing. Once the frictional force generated by the test bearing is known, the coefficient of friction can be calculated by dividing this frictional force by the force (or load) that is applied to the bearing.

Limiting Pressure-Velocity (LPV)

The load and velocity bearing capability of a material may be expressed by the product of the unit pressure P (psi) based upon projected bearing area and the linear shaft velocity V. (ft./min.). The symbol PV will be used to denote this pressure-velocity relationship. The limiting PV (LPV) of a composite is that combination of load and speed when either the coefficient of friction or the temperature at the bearing surface does not stabilize. This increase in torque or temperature results in bearing failure and/or excessive wear. It should be noted that this test is a short-term test independent of wear rate. It is important to note that the addition of fibrous reinforcement is required to develop minimum wear at elevated temperatures.

LPV Based on Increasing Speed

The PV limit based on speed of test bearings formed from various compositions were measured using the device shown in FIG. 1. The load was set at 100 Psi, and the speed was increased in increments of 100 feet/minute until the bearing failed, either by a rapid increase in friction or by a rapid increase in temperature. The test bearings were run at each PV level for about $\frac{1}{2}$ hour before the speed was increased to the next increment of 100 FPM. Thermoplastic polymeric materials are generally prone to failure at these conditions because the high frictional heat generated causes softening and melting.

LPV Based on Increasing Pressure

The PV limit based on increasing pressure of test bearings formed from various compositions were measured using the device shown in FIG. 1. The pressure was increased pneumatically through the air cylinder, or dead weights were added, until the bearing failed, either by a rapid increase in temperature or by a rapid increase in friction. The test bearings were run at each PV level for about $\frac{1}{2}$ hour before the speed was increased to the next increment.

Temperature Generation

The shaft temperature was measured by inserting a thermocouple, which was held in a separate adjustable device directly into a hole in the shaft, and which extended immediately below the bearing. The thermocouple did not actually touch the walls of the shaft.

The present invention will be further illustrated by the following examples, which are intended to be illustrative in nature and are not to be considered as limiting the scope of the invention.

WORKING EXAMPLES

Example 1

A variety of plastic compositions were formed from a variety of polymeric matrix materials, including high performance bearing polymeric matrix materials. Test bearings were formed from the compositions, according to the previously described method. The ratios of materials in the compositions, as well as the blending methods by which the compositions were formed, where applicable, are shown in the Tables (FIGS. 2–9).

Test bearings were also formed from a variety of commercially available plastic materials, which are also shown in the Tables. The commercially available materials are listed as "Commercially Available Cometetive Materials (PreBlended)." The types and concentration of any additives in the commercial materials are also shown in the tables for comparative purposes. All information concerning the commercial compounds was obtained from the manufacturer of the material.

Several tests were performed on the test bearings, including the limiting PV based on speed; the limiting PV based on increasing pressure; wear; temperature generation; and coefficient of friction. The test bearings were tested under typical industry standards as well as under extreme conditions for bearing applications. The test type, test conditions, and test results are also shown in the Tables. Those tests that exceeded the capacity of the tester are indicated by a plus (+) sign.

Table 1

Table 1 (FIG. 2) shows the results of testing the limiting PV based on increasing velocity at 100 psi and the limiting PV based on increasing pressure at 25 feet/minute.

Test bearings formed from compositions having a PEI matrix polymer, DKD, and Teflon fiber generally provided higher PV limits than test bearings formed from compositions having a PEI matrix polymer, DKD, and Teflon powder.

Compositions of polymeric matrix material in combination with only DKD or DKA typically required higher concentrations than compositions containing DKD or DKA in combination with Teflon or boron nitride in order to achieve comparable PV limits.

Compositions formed using the solvent blending method generally provided higher limiting PVs than compositions formed using the dry blending method.

Adding a second additive to compositions containing DKA or DKD provided the highest limiting PVs. Test bearings containing DKD in combination with a second additive, such as Teflon® fiber or boron nitride, had the highest limiting PVs.

Overall, the test results show that all of the present compositions had substantially higher limiting PVs than other commercially available plastic materials.

Table 2

Table 2 (FIG. 3) shows the results of testing the wear (K), shaft temperature, and coefficient of friction of test bearings at 10,000 PV and at three variations of pressure and velocity: 10,000 PV at 200 psi×50 feet/minute; 100 psi×100 feet/minute; and 50 psi×200 feet/minute. These are standard wear conditions for high performance materials. The test results are shown in Table 2.

The test results show that the present compositions and structures provided substantially improved wear, temperature, and friction resistance than other commercially available materials. The test results also show that the method of blending the compositions significantly affected the properties tested.

Table 3

Table 3 (FIG. 4) show the results of testing the wear (K), shaft temperature, and coefficient of friction of test bearings under extreme PV conditions (i.e. at high PV values). These tests were not run in the manner of PV limit where the bearing is run by increasing velocity in thirty-minute intervals. Rather, PV was increased in separate 24 hour tests (with the exception of the 10,000 PV test) by holding pressure constant at 200 psi while increasing the velocity. Thus, the 10,000 PV test was run for one hundred (100) hours, after which the test bearing was removed from the test apparatus, cleaned and weighed, and a new test bearing installed. Thereafter, the 20,000 PV was then run for twenty-four hours (24), after which the test bearing was removed from the test apparatus, cleaned and weighed, and another new test bearing installed, which was run at 30,000 PV for twenty-four hours (24). This sequence was repeated up to the 100,000 PV test, with each of the remaining tests being run for run for twenty-four hours (24).

Compositions having the best wear properties using PEI as the matrix material were PEI/DKD/UMHW polysiloxane (28/70/2) and PEI/DKD/BN (30/60/10).

Compositions having the best wear properties using PEEK as the matrix material were PEEK/DKD/CAPOW L38/H (29/70/1) and PEEK/DKD/BN (50/25/25). Adding siloxane improved the composition, as shown by a comparison of the PEEK compositions including 25% DKD and 25% Boron Nitride.

Compositions having the best wear properties using PPS as the matrix material were PPS/DKD/POLYSILOXANE (28/70/2) and PPS/DKD/graphite (30/10/60). Overall, the test results show that all of the present compositions provided significantly improved wear properties in comparison to other commercially available materials.

Table 4

Table 4 (FIG. 5) shows the comparative results of the wear (K), shaft temperature, and coefficient of friction of test bearings under extreme conditions of high loads and low speeds. The tests were performed at a pressure of 2,000 Psi and a velocity of 25 feet/minute. As in the previous table, the failure point was measured by the melting of the plastic, and extremely high wear was indicated by debris, extremely high temperature, or extremely high friction. The test were run for twenty-four (24) hours.

The test results showed that all of the commercially available preblended compositions failed under these extreme conditions, whereas all of the present compositions survived. The best PEI matrix composition was the PEI/DKD/DC4-7105 (28/70/2). There was not any significant difference between any of the present compositions using the PEEK matrix. Compositions using a PPS matrix and DKD showed a significant improvement as the concentration of DKD increased.

Overall, the test results shown in Table 4 again showed that all of the present compositions provided significantly improved wear properties in comparison to other commercially available materials.

Comparative Example A

A variety of additives may be added to a polymeric matrix material to enhance various characteristics of the plastic material formed from the polymeric matrix material. The thermal conductivity of a variety of some well-known additives is shown in Table 5 (FIG. 6).

To illustrate some of the difficulty in selecting an additive to provide improved wear characteristics in a polymeric matrix material, a variety of compositions were formed using various thermally conductive additives. The ratios of materials in the compositions are shown in Table 6 (FIG. 7). The compositions were blended using one of the previously described methods, which is also indicated in Table 6. Test bearings were formed from the compositions, using the previously described method. The wear, temperature generation, and coefficient of friction of the test bearings were tested according to the foregoing methods.

The data clearly show that the addition of a thermally conductive filler or a solid lubricant to a polymeric matrix does not necessarily result in good wear properties. The data also shows that the addition of a thermally conductive filler and a solid lubricant to a polymeric matrix material does not necessarily result in good wear properties.

Thus, the results of the tests show that the wear properties of a composition cannot be predicted solely on the basis of the thermal conductivity of a material added to a polymeric matrix material. This confirms the unexpected and surprising nature of the results provided by the present compositions and structures.

Comparative Example B

A variety of compositions were formed using various PAN and Pitch carbon fiber materials. The characteristics of the fibers are shown in Table 7 (FIG. 8). The ratios of materials used in the compositions are shown in Table 8

(FIG. 9). The compositions were blended using one of the previously described methods, which is also indicated in Table 8.

The tests results show that the DKD and Dialead fibers provided superior wear characteristics in comparison to other PAN and Pitch carbon fibers, and that the wear properties of the DKD and Dialead fibers are maintained over a wide variation in concentration and in many different types of plastic compositions.

The data also show that the DKD fibers, at identical concentrations, provided greatly improved wear performance in comparison to PAN fibers.

Pitch-based carbon fibers having thermal conductivities in the same range, such as the Dialead, provided similar results to the DKD fibers. Pitch-based carbon fibers with lower thermal conductivities, such as the VMX-24 fibers, did not provide the degree of improvement in wear characteristics as the DKD and Dialead fibers. Because the thermal conductivity generally indicates the degree of graphitization of the carbon fiber, and consequently the degree of lubricity of the fiber, this confirms that structural fibers having relatively high lubricity provide the unexpected wear performance observed in the present compositions and structures.

The results show that there is not a direct correlation between wear and thermal conductivity. Without wishing to be bound by any theory, it is believed that the most important contributing factor to the wear improvements of the present compositions is due to the degree of graphitization and consequently increased lubricity of the fibers, rather than the thermal conductivity of the fibers. The DKA fibers have slightly higher density and significantly higher thermal conductivity than either the DKD or Dialead fibers, and the VMX-24, but they do not provide significantly higher wear characteristics than the DKD fibers. This may be confirmed by comparing the wear performance of compositions containing DKA, DKD, Dialead K 223HG, and VMX-24 fibers.

The results of the tests show that the K-factor of a composition cannot necessarily be predicted on the sole basis of the thermal conductivity of a material added to a polymeric matrix material. The excellent wear results provided by the DKD and Dialead K 223HG carbon fibers, especially at high speeds and high loads, may be due to a combination of thermal conductivity, the fibrous nature of the filler, the graphite content of the filler, the low coefficient of expansion of the filler, and the compatibility with the matrix material.

Comparative Example C

The Coefficient of Thermal Conductivity of a variety of compositions was tested using ASTM E-1461-92 "Thermal Diffusivity of Solids by Flash Method." The ratios of materials used in the compositions is shown in Table 9 (FIG. 10), along with the test results.

The results of the tests show that the thermal conductivity of the present compositions and structures generally fall within the range of less than about 10 W/m° K.

Although particular embodiments of the invention have been described in detail for purposes of illustration, various changes and modifications may be made without departing from the scope and spirit of the invention. All combinations and permutations of the compositions and methods are available for practice in various applications as the need arises. For example, the compositions and methods of the invention may be applied to processes that are presently not practically feasible. Accordingly, the invention is not to be limited except as by the appended claims.

What is claimed is:

1. A plastic article having a bearing surface, comprising:
   a polymeric matrix material; and
   a first additive that is a lubricious reinforcing graphitized pitch-based carbon fiber having a thermal conductivity of at least about 50 W/m° K; and
   a second additive that is lubricious.

2. The plastic article of claim 1, wherein the first additive has a tensile strength of at least about 200 KSI.

3. The plastic article of claim 1, wherein the first additive has a tensile modulus of at least about 100 MSI.

4. The plastic article of claim 1, wherein the first additive has a coefficient of thermal expansion of about −1.4 parts per million/° C.

5. The plastic article of claim 3, wherein the first additive has a density of at least about 2.0 gm/cm$^3$.

6. The plastic article of claim 1, wherein the first additive has a thermal conductivity ranging from about 200 to about 1000 W/m° K.

7. The plastic article of claim 1, wherein the first additive has a thermal conductivity ranging from about 400 to about 800 W/m° K.

8. The plastic article of claim 1, wherein the article comprises from about 5 percent to about 70 percent by weight of the first additive, based on the total weight of the article.

9. The plastic article of claim 1, wherein the article comprises from about 30 percent to about 60 percent by weight of the first additive, based on the total weight of the article.

10. The plastic article of claim 1, wherein the article comprises from about 35 percent to about 55 percent by weight of the first additive, based on the total weight of the article.

11. The plastic article of claim 1, wherein the article comprises a wear factor of less than about 40 under a load of about 200 psi and a velocity of about 50 feet per minute.

12. The plastic article of claim 1, wherein the article comprises a wear factor of less than about 100 under a load of about 200 psi and a velocity of about 50 feet per minute.

13. The plastic article of claim 1, wherein the article comprises a wear factor of less than about 200 under a load of about 200 psi and a velocity of about 50 feet per minute.

14. The plastic article of claim 1, wherein the article comprises a coefficient of friction of less than about 0.40 under a load of about 200 psi and a velocity of about 50 feet per minute.

15. The plastic article of claim 1, wherein the article comprises a maximum temperature of less than about 250° F. under a load of about 200 psi and a velocity of about 50 feet per minute.

16. The plastic article of claim 1, wherein the article comprises a wear factor of less than about 40 under a load of about 2000 psi and at a speed of about 50 feet per minute.

17. The plastic article of claim 1, wherein the article comprises a wear factor of less than about 100 when measured under a load of about 200 psi and at a speed of about 500 feet per minute.

18. The plastic article of claim 1, wherein the polymeric matrix material is selected from the group consisting of polyamideimide, polyetherimide, polyimide, polyetheretherketone, polyphenylene sulfide, liquid crystal polymer, and combinations thereof.

19. The plastic article of claim 1, wherein the lubricious reinforcing fiber is selected from the group consisting of graphitized pitch-based carbon fibers having a tensile strength of greater than about 200 KSI, a tensile modulus greater than about 100 MSI, a density ranging from about 2.15 to about 2.25 gm/cm³, a Tc ranging from about 400 to about 1100 W/m° K, and a diameter ranging from about 7 microns to about 10 microns and combinations thereof.

20. The plastic article of claim 1, wherein the article comprises a wear factor of less than about 25 under a load of about 200 psi and a velocity of about 50 feet per minute.

21. The plastic article of claim 1, wherein the article comprises a wear factor of less than about 100 under a load of about 2000 psi and at a speed of about 50 feet per minute.

22. The plastic article of claim 1, wherein the article comprises a wear factor of less than about 250 when measured under a load of about 200 psi and at a speed of about 500 feet per minute.

23. The plastic article of claim 1, wherein the article comprises from about 2 percent to about 75 percent by weight of the first additive and about 2 percent to about 75 percent by weight of the second additive, based on the total weight of the article.

24. The plastic article of claim 1, wherein the article comprises from about 20 percent to about 60 percent by weight of the first additive and about 20 percent to about 60 percent by weight of the second additive, based on the total weight of the article.

25. The plastic article of claim 24, wherein the article comprises from about 15 percent to about 40 percent by weight of the first additive and about 15 percent to about 40 percent by weight of the second additive, based on the total weight of the article.

26. The plastic article of claim 1, wherein the second additive is selected from the group consisting of boron nitride, carbon, graphite, molybdenum disulfide, talc, tetrafluoroethylene, and combinations thereof.

27. The plastic article of claim 1, wherein the plastic article comprises about 60 percent by weight of the first additive, and about 10 percent by weight of the second additive, based on the total weight of the article.

28. The plastic article of claim 27, wherein the first additive is a graphitized pitch-based carbon fiber having a tensile strength of greater than about 200 KSI, a tensile modulus greater than about 100 MSI, a density ranging from about 2.15 to about 2.25 gm/cm³, a Tc ranging from about 400 to about 1100 W/m° K, and a diameter ranging from about 7 microns to about 10 microns, the second additive is boron nitride platelets, and the polymeric matrix material is selected from the group consisting of polyamideimide, polyetherimide, polyimide, polyetheretherketone, polyphenylene sulfide, liquid crystal polymer, and combinations thereof.

29. The plastic article of claim 27, wherein the first additive is a graphitized pitch-based carbon fiber having a tensile strength of greater than about 200 KSI, a tensile modulus greater than about 100 MSI, a density ranging from about 2.15 to about 2.25 gm/cm3, a Tc ranging from about 400 to about 1100 W/m° K, and a diameter ranging from about 7 microns to about 10 microns, the second additive is tetrafluoroethylene, and the polymeric matrix material is selected from the group consisting of polyamideimide, polyetherimide, polyimide, polyetheretherketone, polyphenylene sulfide, liquid crystal polymer, and combinations thereof.

30. A plastic article having a bearing surface, comprising:
a polymeric matrix material;
about 2 percent to about 75 percent by weight of a first additive comprising graphitized pitch-based carbon fibers having a density of at least about 2.0 gm/cm³; and
about 2 percent to about 75 percent by weight of a second additive,
wherein the plastic article has a wear factor of less than about 200 under a load of about 200 psi and a velocity of about 50 feet per minute.

31. The plastic article of claim 30, wherein the polymeric matrix material is selected from the group consisting of polyamideimide, polyetherimide, polyimide, polyetheretherketone, polyphenylene sulfide, liquid crystal polymer, and combinations thereof.

32. The plastic article of claim 31, wherein the first additive is selected from the group consisting of graphitized pitch-based carbon fibers having a tensile strength of greater than about 200 KSI, a tensile modulus greater than about 100 MSI, a density ranging from about 2.15 to about 2.25 gm/cm3, a Tc ranging from about 400 to about 1100 W/m° K, and a diameter ranging from about 7 microns to about 10 microns and combinations thereof.

33. The plastic article of claim 32, wherein the second additive is selected from the group consisting of boron nitride, carbon, graphite, molybdenum disulfide, talc, tetrafluoroethylene, and combinations thereof.

34. A plastic article having a bearing surface, comprising:
a polymeric matrix material selected from the group consisting of polyamideimide, polyetherimide, polyimide, polyetheretherketone, polyphenylene sulfide, liquid crystal polymer, and combinations thereof;
about 2 percent to about 75 percent by weight of a first additive selected from the group consisting of graphitized pitch-based carbon fibers having a tensile strength of greater than about 200 KSI, a tensile modulus greater than about 100 MSI, a density ranging from about 2.15 to about 2.25 gm/cm3, a Tc ranging from about 400 to about 1100 W/mEK, and a diameter ranging from about 7 microns to about 10 microns, and combinations thereof; and
about 2 percent to about 75 percent by weight of a second additive selected from the group consisting of boron nitride, carbon, graphite, molybdenum disulfide, talc, tetrafluoroethylene, and combinations thereof;
wherein the plastic article has a wear factor of less than about 200 under a load of about 200 psi and a velocity of about 50 feet per minute.

35. A plastic article having a bearing surface, comprising:
a polymeric matrix material;
a lubricious reinforcing first additive comprising graphitized pitch-based carbon fibers; and
a lubricious second additive;
wherein the article has a wear factor of less than about 25 under a load of about 200 psi and a velocity of about 50 feet per minute.

36. The plastic article of claim 35, wherein the second additive is selected from the group consisting of boron nitride, carbon, graphite, molybdenum disulfide, talc, tetrafluoroethylene, and combinations thereof.

37. The plastic article of claim 35, wherein the first additive is thermally conductive.

38. The plastic article of claim 37, wherein the first additive is a graphitized carbon fiber having a density of at least about 2.0 gm/cm³.

39. The plastic article of claim 35, wherein the second additive is tetrafluoroethylene.

40. The plastic article of claim 38, wherein the second additive is boron nitride platelet.

41. The plastic article of claim 37, wherein the first additive has a thermal conductivity ranging from about 50 to about 1500 W/m° K.

42. The plastic article of claim 37, comprising at least about 5 percent to about 75 percent by weight of the first additive, based on the total weight of the article.

43. The plastic article of claim 42, comprising at least about 2 percent by weight to about 75 percent by weight of the second additive, based on the total weight of the article.

44. The plastic article of claim 37, comprising at least about 2 percent to about 75 percent by weight of the first additive, and at least about 2 percent to about 75 percent by weight of the second additive, based on the total weight of the article.

45. The plastic article of claim 37, wherein the polymeric matrix material is selected from the group consisting of polyamideimide, polyetherimide, polyimide, polyetheretherketone, polyphenylene sulfide, liquid crystal polymer, and combinations thereof.

46. The plastic article of claim 37, wherein the article comprises a wear factor of less than about 100 under a load of about 200 psi and a velocity of about 50 feet per minute.

47. The plastic article of claim 35, wherein the article comprises a coefficient of friction of less than about 0.40 under a load of about 200 psi and a velocity of about 50 feet per minute.

48. The plastic article of claim 35, wherein the article comprises a maximum temperature of less than about 250° F. under a load of about 200 psi and a velocity of about 50 feet per minute.

49. The plastic article of claim 35, wherein the article comprises a wear factor of less than about 100 under a load of about 2000 psi and at a speed of about 50 feet per minute.

50. The plastic article of claim 35, wherein the article comprises a wear factor of less than about 250 when measured under a load of about 200 psi and at a speed of about 500 feet per minute.

51. The plastic article of claim 35, wherein the lubricious reinforcing first additive includes a solid lubricant.

52. The plastic article of claim 51, wherein the lubricious reinforcement fiber includes a solid lubricant.

53. The plastic article of claim 51, wherein the lubricious reinforcement fiber is coated with the solid lubricant.

54. The plastic article of claim 51, wherein the lubricious reinforcement fiber and the solid lubricant are unitary.

55. The plastic article of claim 51, wherein the solid lubricant is graphite.

56. The plastic article of claim 52, wherein the solid lubricant is graphite.

57. The plastic article of claim 53, wherein the solid lubricant is graphite.

58. The plastic article of claim 35, wherein the article comprises a thermal conductivity of less than about 10 W/m° K.

59. An additive for a polymeric matrix material, comprising:
a lubricious reinforcing first additive comprising graphitized pitch-based carbon fibers; and
a lubricious second additive.

60. A plastic article having a bearing surface, comprising:
a polymeric matrix material;
a first additive that is a lubricious
a first additive that is a lubricious graphitized pitch-based carbon fiber having a thermal conductivity of at least about 50 W/m° K; and
a lubricious second additive.

61. A plastic article having a bearing surface, comprising:
a polymeric matrix material;
a first additive that is a lubricious graphitized pitch-based carbon fiber having a thermal conductivity of at least about 50 W/m° K; and
a lubricious second additive selected from the group consisting of boron nitride, carbon, graphite, molybdenum disulfide, talc, tetrafluoroethylene, and combinations thereof.

62. The article of claim 1, wherein the article is formed by injection molding.

63. The article of claim 1, wherein the distribution of the additive in the article is homogeneous.

64. The article of claim 1, wherein the article is a sleeve bearing.

\* \* \* \* \*